US007592995B2

(12) United States Patent
Sugino et al.

(10) Patent No.: US 7,592,995 B2
(45) Date of Patent: Sep. 22, 2009

(54) LIQUID CRYSTAL DISPLAY

(75) Inventors: Michiyuki Sugino, Chiba (JP); Yuji Kikuchi, Kuroiso (JP); Toshihiko Osada, Sakura (JP); Takashi Yoshii, Chiba (JP); Makoto Shiomi, Tenri (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 835 days.

(21) Appl. No.: 10/488,221

(22) PCT Filed: Nov. 11, 2002

(86) PCT No.: PCT/JP02/11745

§ 371 (c)(1), (2), (4) Date: Mar. 2, 2004

(87) PCT Pub. No.: WO03/041043

PCT Pub. Date: May 15, 2003

(65) Prior Publication Data

US 2004/0201564 A1 Oct. 14, 2004

(30) Foreign Application Priority Data

| | | | |
|---|---|---|---|
| Nov. 9, 2001 | (JP) | ............................ | 2001-344078 |
| Aug. 19, 2002 | (JP) | ............................ | 2002-237875 |
| Sep. 4, 2002 | (JP) | ............................ | 2002-258828 |
| Sep. 18, 2002 | (JP) | ............................ | 2002-271192 |

(51) Int. Cl.
*G09G 3/36* (2006.01)
*G02F 1/133* (2006.01)

(52) U.S. Cl. ........................................ 345/101; 349/72

(58) Field of Classification Search ............ 345/87–109
See application file for complete search history.

(56) References Cited

U.S. PATENT DOCUMENTS

| | | | | |
|---|---|---|---|---|
| 5,347,294 | A * | 9/1994 | Usui et al. | 345/89 |
| 7,397,457 | B2 * | 7/2008 | Sugino et al. | 345/89 |

FOREIGN PATENT DOCUMENTS

| | | | |
|---|---|---|---|
| JP | 3-98085 | A | 4/1991 |
| JP | 4-46408 | B2 | 7/1992 |
| JP | 4-288589 | A | 10/1992 |
| JP | 04-318516 | A | 11/1992 |
| JP | 04-365094 | A | 12/1992 |
| JP | 6-230750 | A | 8/1994 |
| JP | 3052418 | | 6/2000 |
| JP | 3167351 | | 5/2001 |

* cited by examiner

*Primary Examiner*—Srilakshmi K Kumar
(74) *Attorney, Agent, or Firm*—Birch, Stewart, Kolasch & Birch, LLP

(57) ABSTRACT

An emphasis converter 52 compares the image data of the current vertical period with the image data of the previous vertical period and controls the input image data to a liquid crystal display panel 4 based on the emphasis conversion parameters stored in tables of ROMs 3*a* to 3*c* so as to achieve accelerated drive. A microcomputer 38 is able to realize stable control of selecting emphasis conversion parameters by adding hysteresis to the detected temperature from a thermistor 37 even when the detected temperature fluctuates up and down crossing the temperature threshold.

9 Claims, 26 Drawing Sheets

FIG. 2
CONVENTIONAL ART

Current frame data

| Previous frame data | 0 | 32 | 64 | 96 | 128 | 160 | 192 | 224 | 255 |
|---|---|---|---|---|---|---|---|---|---|
| 0 | 0 | 70 | 147 | 182 | 206 | 227 | 241 | 255 | 255 |
| 32 | 0 | 32 | 94 | 142 | 177 | 202 | 224 | 239 | 255 |
| 64 | 0 | 0 | 64 | 116 | 157 | 193 | 218 | 241 | 255 |
| 96 | 0 | 0 | 31 | 96 | 141 | 177 | 209 | 234 | 255 |
| 128 | 0 | 0 | 18 | 71 | 128 | 169 | 203 | 232 | 255 |
| 160 | 0 | 0 | 0 | 53 | 111 | 160 | 199 | 230 | 255 |
| 192 | 0 | 0 | 0 | 29 | 92 | 148 | 192 | 228 | 255 |
| 224 | 0 | 0 | 0 | 13 | 55 | 133 | 183 | 224 | 255 |
| 255 | 0 | 0 | 0 | 0 | 48 | 117 | 173 | 220 | 255 |

Table content in ROM3

*FIG. 8A*

Current frame data (columns); Previous frame data (rows)

| | 0 | 32 | 64 | 96 | 128 | 160 | 192 | 224 | 255 |
|---|---|---|---|---|---|---|---|---|---|
| 0 | 0 | 51 | 118 | 165 | 194 | 214 | 230 | 242 | 255 |
| 32 | 0 | 32 | 120 | 159 | 183 | 206 | 226 | 240 | 255 |
| 64 | 0 | 12 | 64 | 110 | 150 | 182 | 209 | 234 | 255 |
| 96 | 0 | 0 | 48 | 96 | 140 | 175 | 204 | 232 | 255 |
| 128 | 0 | 0 | 43 | 81 | 128 | 167 | 201 | 232 | 255 |
| 160 | 0 | 0 | 35 | 66 | 117 | 160 | 196 | 229 | 255 |
| 192 | 0 | 0 | 2 | 56 | 105 | 152 | 192 | 227 | 255 |
| 224 | 0 | 0 | 0 | 50 | 85 | 139 | 186 | 224 | 255 |
| 255 | 0 | 0 | 0 | 44 | 75 | 136 | 181 | 215 | 255 |

Table content in ROM3c(LEVEL2)

*FIG. 8B*

Current frame data (columns); Previous frame data (rows)

| | 0 | 32 | 64 | 96 | 128 | 160 | 192 | 224 | 255 |
|---|---|---|---|---|---|---|---|---|---|
| 0 | 0 | 70 | 147 | 182 | 206 | 227 | 241 | 255 | 255 |
| 32 | 0 | 32 | 94 | 142 | 177 | 202 | 224 | 239 | 255 |
| 64 | 0 | 0 | 64 | 116 | 157 | 193 | 218 | 241 | 255 |
| 96 | 0 | 0 | 31 | 96 | 141 | 177 | 209 | 234 | 255 |
| 128 | 0 | 0 | 18 | 71 | 128 | 169 | 203 | 232 | 255 |
| 160 | 0 | 0 | 0 | 53 | 111 | 160 | 199 | 230 | 255 |
| 192 | 0 | 0 | 0 | 29 | 92 | 148 | 192 | 228 | 255 |
| 224 | 0 | 0 | 0 | 13 | 55 | 133 | 183 | 224 | 255 |
| 255 | 0 | 0 | 0 | 0 | 48 | 117 | 173 | 220 | 255 |

Table content in ROM3a(LEVEL0)

LEVEL:Emphasis conversion parameters
Threash:Threshold temperature for selection of the parameters

FIG. 12

Current frame data

| Previous frame data | | 0 | 32 | 64 | 96 | 128 | 160 | 192 | 224 | 255 |
|---|---|---|---|---|---|---|---|---|---|---|
| LEVEL0 | 0 | | | | | | | | | |
| | 32 | | | | | | | | | |
| | 64 | | | | | | | | | |
| | 96 | | | | | | | | | |
| | 128 | | | | | | | | | |
| | 160 | | | | | | | | | |
| | 192 | | | | | | | | | |
| | 224 | | | | | | | | | |
| | 255 | | | | | | | | | |
| LEVEL1 | 0 | | | | | | | | | |
| | ... | | | | | | | | | |
| | 255 | | | | | | | | | |
| LEVEL2 | 0 | | | | | | | | | |
| | ... | | | | | | | | | |
| | 255 | | | | | | | | | |

FIG. 14A

Current frame data (columns); Previous frame data (rows)

| | 0 | 32 | 64 | 96 | 128 | 160 | 192 | 224 | 255 |
|---|---|---|---|---|---|---|---|---|---|
| 0 | 0 | 51 | 118 | 165 | 194 | 214 | 230 | 242 | 255 |
| 32 | 0 | 32 | 120 | 159 | 183 | 206 | 226 | 240 | 255 |
| 64 | 0 | 12 | 64 | 110 | 150 | 182 | 209 | 234 | 255 |
| 96 | 0 | 0 | 48 | 96 | 140 | 175 | 204 | 232 | 255 |
| 128 | 0 | 0 | 43 | 81 | 128 | 167 | 201 | 232 | 255 |
| 160 | 0 | 0 | 35 | 66 | 117 | 160 | 196 | 229 | 255 |
| 192 | 0 | 0 | 2 | 56 | 105 | 152 | 192 | 227 | 255 |
| 224 | 0 | 0 | 0 | 50 | 85 | 139 | 186 | 224 | 255 |
| 255 | 0 | 0 | 0 | 44 | 75 | 136 | 181 | 215 | 255 |

Table content in ROM3d

FIG. 14B

Current frame data (columns); Previous frame data (rows)

| | 0 | 32 | 64 | 96 | 128 | 160 | 192 | 224 | 255 |
|---|---|---|---|---|---|---|---|---|---|
| 0 | 0 | 70 | 147 | 182 | 206 | 227 | 241 | 255 | 255 |
| 32 | 0 | 32 | 94 | 142 | 177 | 202 | 224 | 239 | 255 |
| 64 | 0 | 0 | 64 | 116 | 157 | 193 | 218 | 241 | 255 |
| 96 | 0 | 0 | 31 | 96 | 141 | 177 | 209 | 234 | 255 |
| 128 | 0 | 0 | 18 | 71 | 128 | 169 | 203 | 232 | 255 |
| 160 | 0 | 0 | 0 | 53 | 111 | 160 | 199 | 230 | 255 |
| 192 | 0 | 0 | 0 | 29 | 92 | 148 | 192 | 228 | 255 |
| 224 | 0 | 0 | 0 | 13 | 55 | 133 | 183 | 224 | 255 |
| 255 | 0 | 0 | 0 | 0 | 48 | 117 | 173 | 220 | 255 |

Table content in ROM3e

FIG. 16

Current frame data

| Previous frame data | | 0 | 32 | 64 | 96 | 128 | 160 | 192 | 224 | 225 |
|---|---|---|---|---|---|---|---|---|---|---|
| LEVEL0 | 0 | | | | | | | | | |
| | 32 | | | | | | | | | |
| | 64 | | | | | | | | | |
| | 96 | | | | | | | | | |
| | 128 | | | | | | | | | |
| | 160 | | | | | | | | | |
| | 192 | | | | | | | | | |
| | 224 | | | | | | | | | |
| | 255 | | | | | | | | | |
| LEVEL1 | 0 | | | | | | | | | |
| | ⋮ | | | | | | | | | |
| | 255 | | | | | | | | | |

Table contact in ROM3f

LEVEL:Emphasis conversion parameters
Threash:Threshold temperature for selection of the parameters

FIG. 23

Current frame data

Previous frame data

| | | 0 | 32 | 64 | 96 | 128 | 160 | 192 | 224 | 225 |
|---|---|---|---|---|---|---|---|---|---|---|
| LEVEL0 | 0 | | | | | | | | | |
| | 32 | | | | | | | | | |
| | 64 | | | | | | | | | |
| | 96 | | | | | | | | | |
| | 128 | | | | | | | | | |
| | 160 | | | | | | | | | |
| | 192 | | | | | | | | | |
| | 224 | | | | | | | | | |
| | 255 | | | | | | | | | |
| LEVEL1 | 0 | | | | | | | | | |
| | ⋮ | | | | | | | | | |
| | 255 | | | | | | | | | |
| LEVEL2 | 0 | | | | | | | | | |
| | ⋮ | | | | | | | | | |
| | 255 | | | | | | | | | |

Table content in ROM3J

LIQUID CRYSTAL DISPLAY

This application is the national phase under 35 U.S.C. § 371 of PCT International Application No. PCT/JP02/11745 which has an International filing date of Nov. 11, 2002, which designated the United States of America, and was amended on May 19, 2003.

This nonprovisional application claims priority under 35 U.S.C. § 119(a) on four (4) Patent Applications No.(s): (1) 2001-344078 filed in JAPAN on Nov. 9, 2001; (2) 2002-237875 filed in Japan on Aug. 19, 2002; (3) 2002-258828 filed in Japan on Sep. 4, 2002; and (4) 2002-271192 filed in Japan on Sep. 18, 2002, which are all herein incorporated by reference.

TECHNICAL FIELD

The present invention relates to a liquid crystal display for image display using a liquid crystal display panel, and in particular relates to a liquid crystal display wherein the optical response characteristic of the liquid crystal display panel can be improved.

BACKGROUND ART

Recently, as personal computers and television receivers have become lighter and thinner, reduction in thickness and weight of display devices has also been wanted. In answer to such demands, flat panel type displays such as liquid crystal displays (LCDs) have been developed in place of cathode ray tubes (CRTs).

An LCD is a display device which displays desired image data by applying electric fields across a liquid crystal layer having anisotropic dielectric constants, injected between a pair of substrates so that the strength of the electric fields is controlled to thereby control the amount of light passing through the substrates. Such LCDs are typical examples of handy flat panel type displays. Of these, TFT LCDs that employ thin-film transistors (TFT) as switching elements are mainly in use.

Lately, since LCDs have been not only used as the display devices of computers but also used widely as the display devices of television receivers, the need for rendering motion pictures has been increased. However, since the conventional LCDs are low in response speed, they have a drawback that it is difficult to reproduce motion pictures.

In order to make the LCD's response speed problem better, there is a known liquid crystal driving method wherein in accordance with the combination of the input image data of the previous frame and the input image data of the current frame, either a higher (overshot) drive voltage than the predetermined gray scale level voltage that corresponds to the input image data of the current frame or a lower (undershot) drive voltage is supplied to the liquid crystal display panel. In this specification of the present application, this driving scheme should be defined as overshoot (OS) drive.

FIG. 1 shows a schematic configuration of a conventional overshoot drive circuit. Specifically, the input image data (current data) of the N-th frame being about to be displayed and the input image data (previous data) of the (N−1)-th frame being stored in a frame memory 1 are loaded into an emphasis converter 2, wherein the patterns of the gray scale level transitions between both the data and the input image data of the N-th frame are looked up with the applied voltage data table stored in a table memory (ROM) 3 so as to identify applied voltage data, and write-gray scale level data (emphasis converted data) needed for image display of the N-th frame is determined based on the thus obtained applied voltage data (emphasis conversion parameters) so as to be supplied to a liquid crystal display panel 4. Here, emphasis converter 2 and table memory 3 constitute a write-gray scale level determining means.

The applied voltage data (emphasis conversion parameters) stored in the above table memory 3 is obtained beforehand from the actual measurement of the optical response characteristics of liquid crystal display panel 4. When, for example, the number of display signal levels, i.e., the number of display data, is 256 gray scales represented by 8 bits, every level of 256 gray scales may have a piece of applied voltage data. Alternatively, it is also possible that, as shown in FIG. 2, only the measurements for nine representative gray scale levels, one for every 32 gray scale levels, have been stored and the applied voltage data for other gray scale levels is determined by linear interpolation of the above measurements or other operations.

There has been a problem in that it takes long time to make a transition from a certain half gray scale level to another half gray scale level, so that it is impossible for a general liquid crystal display panel to display the half gray scales within the period of one frame (e.g., 16.7 msec. for a case of progressive scan of 60 Hz). This not only produces afterglow but also hinders correct half gray scale display. Use of the above-described overshoot drive circuit, however, enables display of the aimed half gray scale level within a short time as shown in FIG. 3.

As it has been also known that the response speed of liquid crystal greatly depends on the temperature, Japanese Patent Application Laid-open Hei 4 No.318516, for example, discloses a liquid crystal display panel driver that continuously controls and keeps the response speed of gray scale change in an optimal condition without loss of display quality in order to deal with any change of the temperature of liquid crystal display panel.

This configuration includes: RAM for storing one frame of digital image data for display; a temperature sensor for detecting the temperature of the liquid crystal display panel; and a data converting circuit which compares the aforementioned digital image data with the image data that is read out, by a one-frame delay, from the RAM and, if the current image data has changed from the image data one frame before, implements emphasis conversion of the current image data in the direction of the change, in accordance with the detected temperature of the above temperature sensor, whereby display of the liquid crystal display panel is driven based on the image data output from this data converting circuit.

Specifically, suppose that the temperature of the liquid crystal display panel to be detected by the temperature sensor is classified into, for example, three ranges Th, Tm and Tl (Th>Tm>Tl) and three mode signals, corresponding to these ranges, to be output from the A/D converter to the data converting circuit are defined as Mh, Mm and Ml, while in the ROM of the data converting circuit, "3", the number equal to that of the mode signals, tables of image data, which can be accessed by designating the addresses or the value of the current image data and that of the image data delayed by one frame, are stored beforehand. One table which corresponds to the input mode signal is selected, and the image data stored in the table at the memory location designated by the addresses, i.e., the value of the current image data and that of the image data delayed by one frame is read out to be output to the drive circuit of the liquid crystal display panel.

However, in the above configuration disclosed in Japanese Patent Application Laid-open Hei 4 No.318516, three mode signals Mh, Mm and Ml are generated in accordance with the three range values Th, Tm and Tl (Th>Tm>Tl) for the detected temperature, and the emphasis conversion set of parameters is switched in accordance with the mode signal Mh, Mm or Ml. Therefore, if, for example, the detected temperature of the liquid crystal display panel is unstable and changes up and down over the ranges across Th, Tm and Tl, the mode signal also changes frequently between Mh, Mm and Ml, whereby for an identical gray scale level transition, the emphasis conversion parameter read from the ROM will vary. As a result, the image displayed on the liquid crystal display panel results in flickers and the like, degrading image quality.

Further, there are also cases where image quality is degraded due to temperature variation across liquid crystal display panel 4. For example, a rear view showing a schematic configuration of a liquid crystal display with a direct type backlight module is shown in FIG. 4. In FIG. 4, 4 designates a liquid crystal display panel, 11 fluorescent lamps for illuminating the liquid crystal display panel 4 from the rear, 12 an inverter transformer for energizing fluorescent lamps 11, 13 a power supply unit, 14 a video processing circuit board, 15 a sound processing circuit board and 16 a temperature sensor.

Of these, items releasing heat that greatly affects the response speed characteristic of liquid crystal display panel 4 are the electrode portions of fluorescent lamps 11, inverter transformer 12 and power supply unit 13. It is preferred that temperature sensor 16 is arranged inside liquid crystal display panel 4, from its due objective, but is difficult, so the sensor should be attached to another member such as a circuit board.

Therefore, when, for example, the constituents 11 to 15 are arranged as shown in FIG. 4, temperature sensor 16 is attached to sound processing circuit board 15, which is least affected by generation of heat from inverter transformer 12 and power supply unit 13, and the detected output from this temperature sensor 16 is made use of by an overshoot drive circuit provided in video processing circuit board 14.

Also as in a liquid crystal display of a direct type backlight using U-shaped fluorescent lamps 11 shown in FIG. 5(*a*), in a liquid crystal display of a side-edge type backlight using L-shaped fluorescent lamps 11 shown in FIG. 5(*b*) or in any other like configuration, large temperature rises occur in the partial areas of liquid crystal display panel 4 where the electrode portions of fluorescent lamps 11 and the inverter transformer for energizing fluorescent lamps 11 are arranged, so other areas increase more in temperature compared to the hatched areas in FIG. 5.

Here, in the conventional liquid crystal displays, the detected temperature by a single temperature sensor 16 is assumed to be the temperature of the whole of liquid crystal display panel 4 and overshoot drive control is implemented every frame based on this detection. In the actual situation, however, liquid crystal display panel 4 has varying temperature distribution across the panel surface depending on the arrangements of the heat generating elements as stated above.

Resultantly, in the partial areas on liquid crystal display panel 4 where temperature is higher than the detected temperature of temperature sensor 16, insufficient applied voltages of data (emphasis converted data) are supplied possibly causing shadow tailing. On the other hand, in the partial areas on liquid crystal display panel 4 where temperature is lower than the detected temperature of temperature sensor 16, excessive applied voltages of data (emphasis converted data) are applied possibly causing white spots and the like (when in the normally black mode), causing significant image quality degradation of the display image.

Similarly, if this liquid crystal display is put in a place where air is blown onto it from a room air-conditioner or in a sunny place or direct sunshine, part of liquid crystal display panel 4 may decrease or increase in temperature, producing varying temperature distribution across the surface of liquid crystal display panel 4. Resultantly, excessive applied voltages of data (emphasis converted data) may be supplied in partial areas, producing white spots, or insufficient applied voltages of data (emphasis converted data) may be supplied to liquid crystal display panel 4 causing shadow tailing (when in the normally black mode), hence image quality of the display image is significantly degraded. This problem of varying temperature distribution across liquid crystal display panel 4 depending on the place of installation becomes more noticeable as the display screen size becomes greater.

Further, in the case of the above-described conventional liquid crystal display, in the normal installed state (stand-mounted state) shown in FIG. 6(*a*) temperature sensor 16 is arranged at the place where it has least influence of heat from inverter transformer 12, power supply unit 13 and other components. However, when the screen is set at the vertically inverted state (in the suspended state from ceiling) as shown in FIG. 6(*b*) or when rotated by 90 degrees (in the portrait orientation mode) as shown in FIG. 6(*c*), the heat flow path changes hence temperature sensor 16 is significantly affected by generation of heat from the other members, so it is no longer possible to detect the exact temperature of liquid crystal display panel 4.

As a result, correct applied voltages of data (emphasis converted data) corresponding to the temperature of liquid crystal display panel 4 cannot be supplied to liquid crystal display panel 4, causing the problem of image quality of the display image being significantly degraded by shadow tailing due to application of insufficient applied voltages of data (emphasis converted data) to liquid crystal display panel 4 or by white spots due to application of excessive applied voltages of data (emphasis converted data) to liquid crystal display panel 4, (in the case of the normally black mode).

In view of the above, the present invention has been devised to solve the above problem, it is therefore an object to provide a liquid crystal display which can improve the image quality of the display image by making variable control of emphasis conversion parameters in a stable manner even if the detected temperature of the device interior is unstable.

It is another object to provide a liquid crystal display which can prevent image degradation of the display image even if varying temperature distribution across the screen surface of the liquid crystal display panel takes place.

DISCLOSURE OF INVENTION

In order to achieve the above objects, the present invention is configured as follows:

According to the first invention, a liquid crystal display which implements accelerated drive of a liquid crystal display panel by at least comparing the image data of the current vertical period with the image data of the previous vertical period and controlling the input image data to the liquid crystal display panel based on the emphasis conversion parameters obtained from the compared result, comprises: a temperature detecting means for detecting the temperature of the device interior; and a control means for variably controlling the emphasis conversion parameters in accordance with the temperature of the device interior detected by the temperature detecting means, and is characterized in that the control means generates a parameter control signal for variable control of the emphasis conversion parameters, by adding hysteresis to the temperature of the device interior.

According to the second invention, a liquid crystal display for image display using a liquid crystal display panel comprises: a plurality of temperature detecting means for detecting the temperatures of multiply divided areas of the liquid crystal display panel; and a write-gray scale level determining means for determining emphasis converted data that compensates for the optical response characteristic of the liquid crystal display panel, by dividing the input image data of one vertical period into pieces of data for the multiply divided areas of the liquid crystal display panel and implementing emphasis conversion of each piece of divided input image data in accordance with the combination of the detected temperature of the divided area of the liquid crystal display panel in which the input image data is displayed and the gray scale level transitions from the previous vertical period to the current vertical period.

The third invention is the liquid crystal display according to the second aspect, wherein the write-gray scale level determining means comprises: a plurality of table memories which store different sets of emphasis conversion parameters for predetermined plural temperature ranges, for converting the input image data into emphasis converted data that compensates for the optical response characteristic of the liquid crystal display panel in accordance with the gray scale level transitions from the previous vertical period to the current vertical period; and a selector for selecting one of the plural table memories based on the detected temperature of each divided area, of the liquid crystal display panel, where the input image data is displayed, and the emphasis conversion parameters read out from the selected table memory by the selector are used to determine the emphasis converted data corresponding to the input image data, which in turn is supplied as the write-gray scale level data to the liquid crystal display panel.

The fourth invention is the liquid crystal display according to the second invention, wherein the write-gray scale level determining means comprises: a table memory which stores different sets of emphasis conversion parameters for predetermined plural temperature ranges, in separate reference table areas, for converting the input image data into emphasis converted data that compensates for the optical response characteristic of the liquid crystal display panel in accordance with the gray scale level transitions from the previous vertical period to the current vertical period; and a selector for selecting one of the plural reference table areas based on the detected temperature of each divided area, of the liquid crystal display panel, where the input image data is displayed, and the emphasis conversion parameters read out from the selected reference table area in the table memory by the selector are used to determine the emphasis converted data corresponding to the input image data, which in turn is supplied as the write-gray scale level data to the liquid crystal display panel.

The fifth invention is the liquid crystal display according to the second invention, wherein the write-gray scale level determining means comprises: a table memory which stores emphasis conversion parameters for converting the input image data into emphasis converted data that compensates for the optical response characteristic of the liquid crystal display panel in accordance with the gray scale level transitions from the previous vertical period to the current vertical period; a subtracter for subtracting the input image data from the emphasis converted data determined using the emphasis conversion parameters; a multiplier for multiplying the output signal from the subtracter by a weight coefficient k which is variably controlled based on the detected temperature of the divided area of the liquid crystal display panel where the input image data is displayed; and an adder for adding the output signal from the multiplier to the input image data, and the output signal from the adder is supplied as the write-gray scale level data to the liquid crystal display panel.

According to the sixth invention, a liquid crystal display for image display using a liquid crystal display panel, comprises: a plurality of temperature detecting means for detecting the temperatures of multiply divided areas of the liquid crystal display panel; a computing means for generating a control signal by implementing predetermined calculation with regard to the detected temperature data by the plural temperature detecting means; and a write-gray scale level determining means for determining emphasis converted data that compensates for the optical response characteristic of the liquid crystal display panel, by implementing predetermined emphasis conversion of the input image data of the current vertical period in accordance with the control signal generated by the computing means and the gray scale level transitions from the previous vertical period to the current vertical period.

The seventh invention is the liquid crystal display according to the sixth invention, wherein the write-gray scale level determining means comprises: a plurality of table memories which store different sets of emphasis conversion parameters for predetermined plural temperature ranges, for converting the input image data into emphasis converted data that compensates for the optical response characteristic of the liquid crystal display panel in accordance with the gray scale level transitions from the previous vertical period to the current vertical period; and a selector for selecting one of the plural table memories based on the control signal generated by the computing means, and the emphasis conversion parameters read out from the selected table memory by the selector are used to determine the emphasis converted data corresponding to the input image data, which in turn is supplied as the write-gray scale level data to the liquid crystal display panel.

The eighth invention is the liquid crystal display according to the sixth invention, wherein the write-gray scale level determining means comprises: a table memory which stores different sets of emphasis conversion parameters for predetermined plural temperature ranges, in separate reference table areas, for converting the input image data into emphasis converted data that compensates for the optical response characteristic of the liquid crystal display panel in accordance with the gray scale level transitions from the previous vertical period to the current vertical period; and a selector for selecting one of the plural reference table areas based on the control signal generated by the computing means, and the emphasis conversion parameters read out from the reference table area in the selected table memory by the selector are used to determine the emphasis converted data corresponding to the input image data, which in turn is supplied as the write-gray scale level data to the liquid crystal display panel.

The ninth invention is the liquid crystal display according to the sixth invention, wherein the write-gray scale level determining means comprises: a table memory which stores emphasis conversion parameters for converting the input image data into emphasis converted data that compensates for the optical response characteristic of the liquid crystal display panel in accordance with the gray scale level transitions from the previous vertical period to the current vertical period; a subtracter for subtracting the input image data from the emphasis converted data determined using the emphasis conversion parameters; a multiplier for multiplying the output signal from the subtracter by a weight coefficient k which is variably controlled based on the control signal generated by the computing means; and an adder for adding the output signal from the multiplier to the input image data, and the output signal from the adder is supplied as the write-gray scale level data to the liquid crystal display panel.

The tenth invention is the liquid crystal display according to any one of the sixth to ninth inventions, wherein the computing means generates the control signal by calculating the average of the detected temperatures from the plural temperature detecting means.

The eleventh invention is the liquid crystal display according to any one of the sixth to ninth inventions, wherein the computing means generates the control signal by calculating the maximum of the detected temperatures from the plural temperature detecting means.

The twelfth invention is the liquid crystal display according to any one of the sixth to ninth inventions, wherein the computing means generates the control signal by calculating the minimum of the detected temperatures from the plural temperature detecting means.

The thirteenth invention is the liquid crystal display according to any one of the sixth to ninth inventions, wherein the computing means generates the control signal by producing the histogram of the detected temperatures from the plural temperature detecting means.

The fourteenth invention is the liquid crystal display according to any one of the sixth to ninth inventions, wherein the computing means generates the control signal by calculating the weighted average of the detected temperatures from the plural temperature detecting means.

The fifteenth invention is the liquid crystal display according to the fourteenth invention, further comprising a characteristic quantity detecting means for detecting a characteristic quantity of the input image data, wherein the weighted average of the detected temperatures from the multiple temperature detecting means is determined based on the characteristic quantity detected by the characteristic quantity detecting means.

The sixteenth invention is the liquid crystal display according to the fourteenth aspect, further comprising an installed state detecting means for detecting the installed state of the device, wherein the weighted average of the detected temperatures from the multiple temperature detecting means is determined based on the installed state detected by the installed state detecting means.

The seventeenth invention is the liquid crystal display according to the fourteenth invention, further comprising a user command detecting means for detecting the command input from a user, wherein the weighted average of the detected temperatures from the multiple temperature detecting means is determined based on the user command detected by the user command detecting means.

The eighteenth invention is the liquid crystal display according to any one of the sixth to ninth inventions, wherein the computing means generates the control signal by sampling only the detected temperature from a predetermined temperature means, of the detected temperatures detected by the multiple temperature detecting means.

The nineteenth invention is the liquid crystal display according to the eighteenth invention, further comprising a characteristic quantity detecting means for detecting a characteristic quantity of the input image data, wherein only the detected temperature from a predetermined temperature detecting means is sampled from the detected temperatures of the plural temperature detecting means, based on the characteristic quantity detected by the characteristic quantity detecting means.

The twentieth invention is the liquid crystal display according to the eighteenth invention, further comprising an installed state detecting means for detecting the installed state of the device, wherein only the detected temperature from a predetermined temperature detecting means is sampled from the detected temperatures of the plural temperature detecting means, based on the installed state detected by the installed state detecting means.

The twenty-first invention is the liquid crystal display according to the eighteenth invention, further comprising a user command detecting means for detecting the command input from a user, wherein only the detected temperature from a predetermined temperature detecting means is sampled from the detected temperatures of the plural temperature detecting means, based on the user command detected by the user command detecting means.

The present invention provides the following operations and effects.

That is, according to the first invention configured as above, even when the detected temperature inside the device is unstable, it is possible to improve the image quality of the display image by variably controlling the emphasis conversion parameters in a stable manner.

According to the second to the fifth inventions configured as above, based on the detected temperature for each partial area of the liquid crystal display panel, suitable overshoot drive for the input image data to be displayed in the partial area is implemented. Therefore, it is possible to obtain write-gray scale level data corresponding to the temperature distribution across the surface of the liquid crystal display panel, hence prevent degradation of the image quality of the display image.

According to the sixth to the twenty-first inventions configured as above, since it is possible to implement a suitable emphasis converting process for the input image data even when a varying temperature distribution is occurring across the surface of the liquid crystal display panel, it is possible to prevent image degradation of the display image.

BRIEF DESCRIPTION OF DRAWINGS

FIG. 2 is a schematic illustration showing one example of the table content in an OS table memory used in an overshoot drive circuit.

FIG. 8 includes schematic illustrative charts, showing examples of table contents in ROMs in the first embodiment.

FIG. 12 is a schematic illustration showing another example of table content in ROM in the second embodiment.

FIG. 14 includes schematic illustrative charts showing the table contents in OS table memories used in the third embodiment.

FIG. 16 is a schematic illustration showing the table content in an OS table memory used in the fourth embodiment.

FIG. 23 is a schematic illustration showing the table content in an OS table memory used in the seventh embodiment.

BEST MODE FOR CARRYING OUT THE INVENTION

The embodiments of the present invention will be described with reference to the drawings.

The First Embodiment

Figure 7:
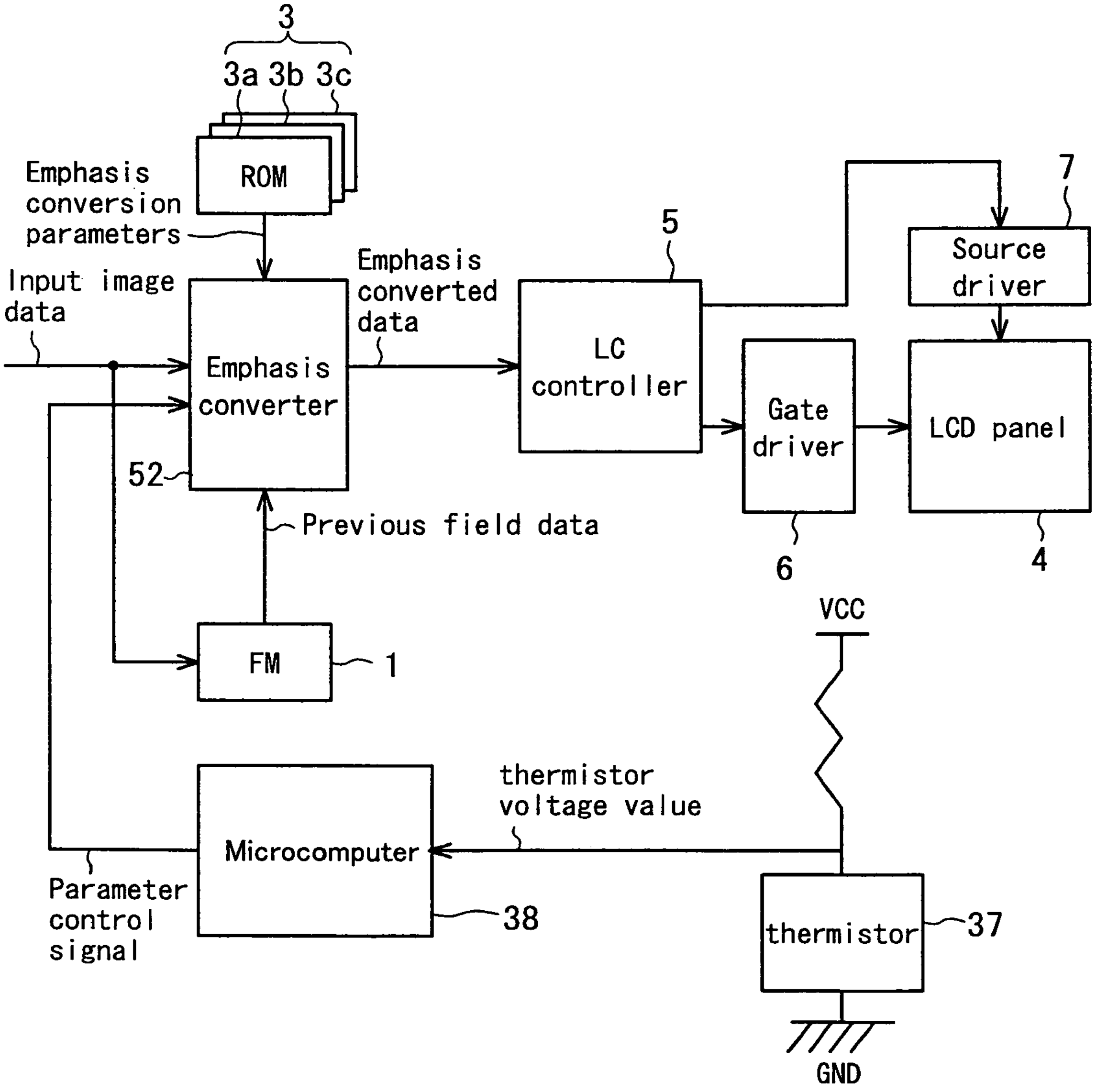
FIG. 7 is a block diagram showing a schematic configuration of essential components in the first embodiment of a liquid crystal display of the present invention.
Figure 9:
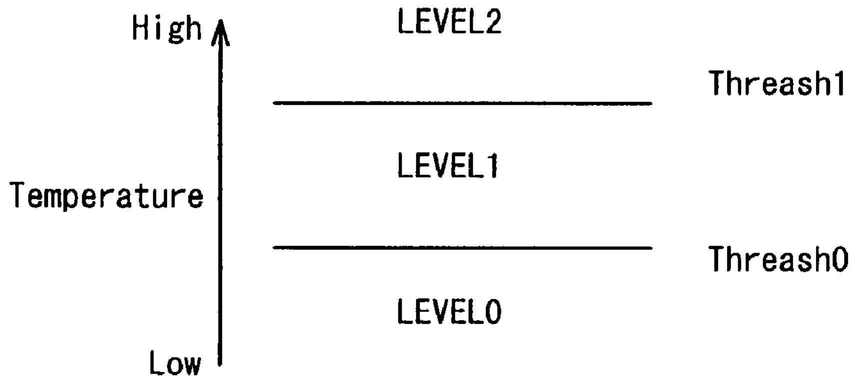
FIG. 9 is an illustrative diagram showing the relationship between the detected temperature and the emphasis conversion parameter level in the first embodiment.
Figure 10:
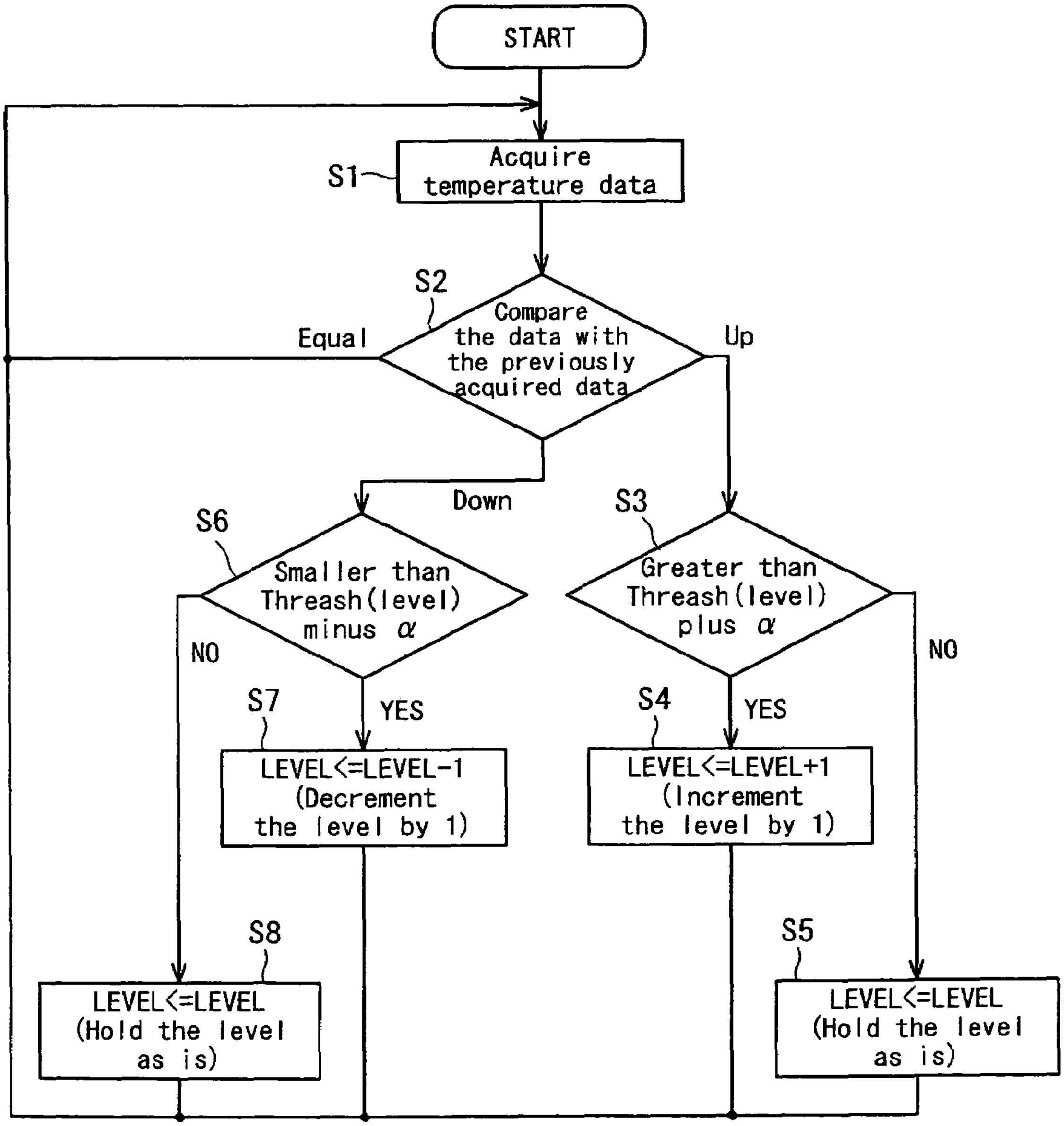
FIG. 10 is a flowchart showing a hysteresis process in the first embodiment.

Now, the first embodiment of the present invention will be described in detail with reference to FIGS. 7 to 10. Here, FIG. 7 is a block diagram showing a schematic configuration of essential components in a liquid crystal display of this embodiment; FIG. 8 includes schematic illustrative charts, showing table contents in ROMs in the liquid crystal display of this embodiment; FIG. 9 is an illustrative diagram showing the relationship between the detected temperature and the level at which the emphasis conversion parameter is switched in the liquid crystal display of this embodiment; and FIG. 10 is a flowchart showing a hysteresis process in the liquid crystal display of this embodiment.

In FIG. 7, 1 designates a frame memory (FM), 3 a table memory (ROM) storing emphasis conversion parameters in accordance with gray scale level transitions of input image data, 52 an emphasis converter which, by comparing the current frame image data with the previous frame image data read out from FM1 and reading out emphasis conversion parameters in accordance with the comparison results (gray scale level transitions) from ROM 3, determines and outputs the emphasis converted data (compensated image data), and 5 a liquid crystal controller which, based on the emphasis converted data from emphasis converter 52, outputs liquid crystal drive signals to a gate driver 6 and source driver 7 of liquid crystal display panel 4.

Designated at 37 is a thermistor for detecting the temperature of the device interior, and 38 a microcomputer for outputting parameter control signal which implements a hysteresis process with regard to the voltage value (detected temperature) from thermistor 37 and implements selecting control of the emphasis conversion parameters to be read out from ROM 3.

In the above configuration, ROM 3 is composed of three ROMs 3*a* to 3*c*, storing respective sets of emphasis converting parameters for LEVEL0 to LEVEL2 corresponding to the temperature of the device interior. As shown in FIG. 8, each of ROMs 3*a* to 3*c*, stores a table which holds emphasis conversion parameters corresponding to the gray scale transitions of the input image data (where the number of display signal levels, i.e., the number of display data, is 8 bits or 256 gray scale levels.)

Emphasis converter 52, in accordance with the parameter control signal from microcomputer 38, adaptively selects one from ROMs 3*a* to 3*c*, reads the emphasis conversion parameters from the selected ROM 3*a* to 3*c* in accordance with the gray scale transitions from the previous frame to the current frame and determines, based on the parameters, compensated image data to be output to liquid crystal controller 5.

For example, if the parameter control signal from microcomputer 38 indicates "LEVEL0", the previous frame data from FM1 is "0" and the input image data in the current frame is "128", emphasis converter 52 selects ROM 3*a* and acquires an emphasis conversion parameter that indicates 'output a data value of "194"'.

Emphasis converter 52, based on the emphasis conversion parameters from ROM 3, creates an input/output table for 0 to 255 levels, determines compensated image data (emphasis converted data), taking into account the emphasis conversion parametric data, and outputs it to liquid crystal controller 5. For example, when the previous frame data is "0" and the current frame data is "100" or in other words, when the table stored in ROM 3 has no corresponding value (no value is assigned in the table), emphasis converter 52 implements linear interpolation or other calculation, so that a data value of about "175" is output.

In the liquid crystal display of this embodiment, as shown in FIG. 9, three sets of emphasis conversion parameters corresponding to three levels, LEVEL0 to LEVEL2 for different temperatures of the device interior are prepared and stored in the tables in ROMs 3*a* to 3*c*. In order to select the emphasis conversion parameters, threshold temperatures Threash0 and Threash1 are set up. However, when the temperature of the device interior detected by thermistor 37 fluctuates around the aforementioned threshold temperature, there occurs the problem that the emphasis conversion parameters (LEVEL0 to LEVEL2) continually change.

To deal with this, the present embodiment makes microcomputer 38 add hysteresis to the thermistor's detected temperature to generate a parameter control signal. This hysteresis process implemented by microcomputer 38 will be described hereinbelow with reference to the flowchart in FIG. 10. Here, in this embodiment, microcomputer 38 is assumed to acquire the temperature data of the device interior, in a periodic manner (e.g., about every 120 msec).

To begin with, the temperature data from thermistor 37 is acquired (Step S1) and compared with the temperature data that has been acquired previously (Step S2). If the current temperature data is higher, in other words if the temperature of the device interior has risen, the current temperature data is compared with the upper temperature threshold of the current LEVEL, Threash (LEVEL) plus α (Step S3). Here, α is an arbitrary value determined beforehand.

When the current temperature data is greater, the current LEVEL is increased by 1 (Step S4) and the operation returns to Step S1. If the current temperature data is smaller, the operation returns to Step S1 without the current LEVEL being unchanged (Step S5).

On the other hand, if the current temperature data was determined to be lower at Step S2, in other words if the temperature of the device interior has gone down, the current temperature data is compared with the lower temperature threshold of the current LEVEL, Threash(LEVEL-1) minus α (Step S6). When the current temperature data is smaller, the current LEVEL is decreased by 1 (Step S7) and the operation returns to Step S1. If the current temperature data is greater, the operation returns to Step S1 without the current LEVEL being unchanged (Step S8).

If for example, the current emphasis conversion parameters are of LEVEL1 and the currently obtained temperature is higher than the previously obtained temperature, the current temperature is compared with Threash1 plus α, and if it is still higher, the level is stepped up to LEVEL2. If the currently obtained temperature is lower than the previously obtained temperature, the current temperature is compared with Threash0 minus α, and if it is still lower, the level is stepped down to LEVEL0.

As described heretofore, in the present embodiment the temperature threshold is adjusted by ±α adaptively according to the variation in temperature so as to add hysteresis to the detected temperature. Accordingly, even when the detected temperature fluctuates up and down around the temperature threshold, it is possible to achieve stable selecting control of emphasis conversion parameters (LEVEL0-LEVEL2) without causing sharp fluctuations of the emphasis conversion parameters (LEVEL0-LEVEL2) following the temperature fluctuations. Thus, it is possible to improve the image quality of the display image.

The Second Embodiment

Figure 11:
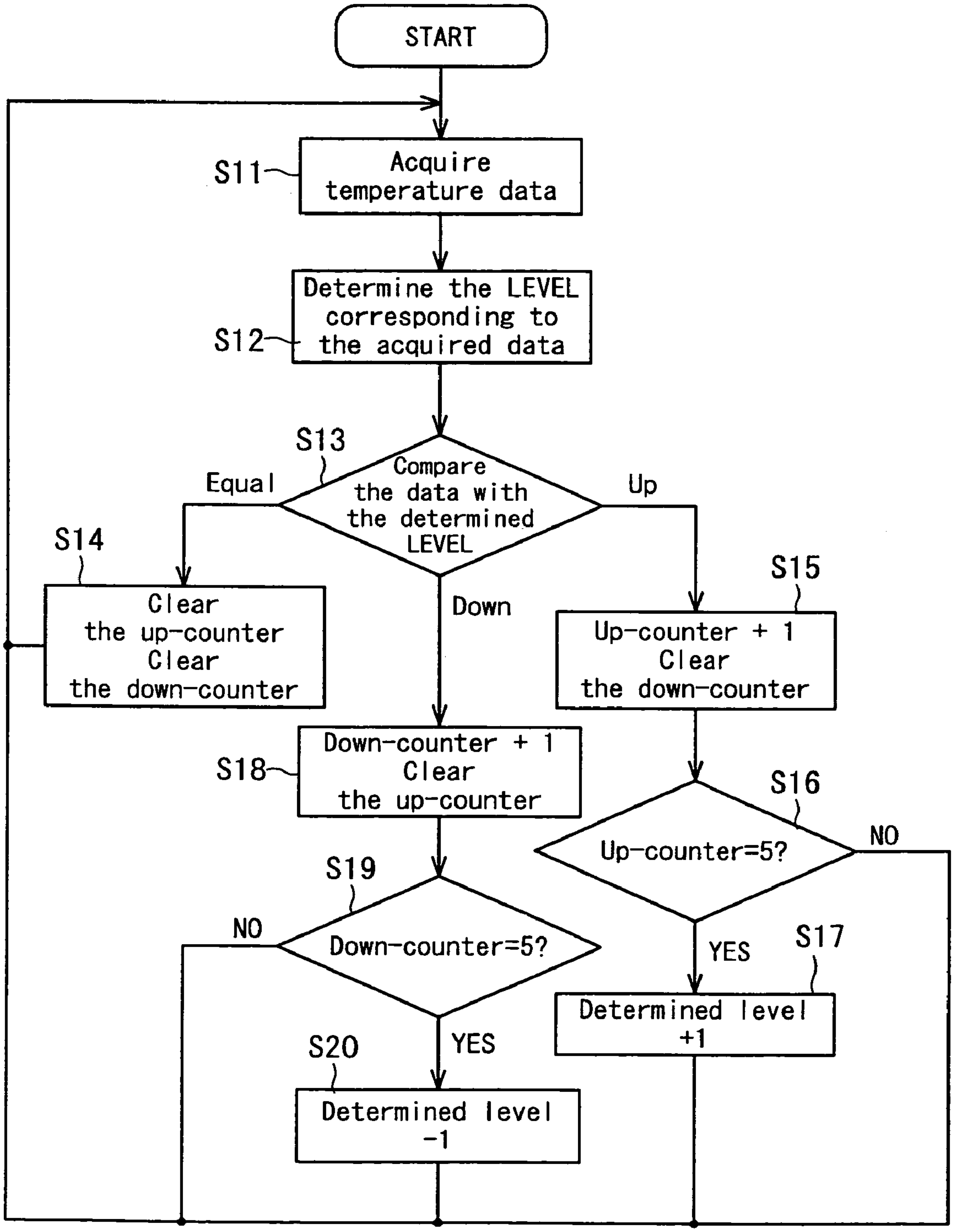
FIG. 11 is a flowchart showing a hysteresis process in the second embodiment of a liquid crystal display of the present invention.

Next, the second embodiment of the present invention will be described in detail with reference to FIG. 11. Here, FIG. 11 is a flowchart showing a hysteresis process in the liquid crystal display of this embodiment.

The configuration of the liquid crystal display of this embodiment is identical with that of the first embodiment described above with reference to FIG. 7. The point of difference is in the hysteresis process in microcomputer 38, so description will be made as to this particular point with reference to the flowchart in FIG. 11.

First, the temperature data from thermistor 37 is acquired (Step S11). The current LEVEL for the emphasis conversion parameters corresponding to the obtained temperature data is determined (Step S12). The thus determined current LEVEL is compared with the determined LEVEL for the emphasis conversion parameters having been selected (Step S13). If both are equal, both the counter values on the up-counter and down-counter are cleared (Step S14) and the operation returns to Step S11.

When the current LEVEL is higher than the determined LEVEL, the count on the up-counter is incremented by 1 while the count on the down-counter is cleared (Step S15), and judgment of whether the count on the up-counter reaches 5 is made (Step S16). When the count on the up-counter has not yet reached 5, the operation returns to Step S11. When the count on the up-counter has reached 5, the determined LEVEL is incremented by 1 and the operation returns to Step S11 (Step S17).

On the other hand, when the current LEVEL is determined to be lower than the determined LEVEL at Step S14, the count on the down-counter is incremented by 1 while the count on the up-counter is cleared (Step S18), and judgment of whether the count on the down-counter reaches 5 is made (Step S19). When the count on the down-counter has not yet reached 5, the operation returns to Step S11. When the count on the down-counter has reached 5, the determined LEVEL is decremented by 1 and the operation returns to Step S11 (Step S17).

As described above, in this embodiment, hysteresis is given to the detected temperature by monitoring the variation in LEVEL with the temperature thresholds fixed, and change of the LEVEL to a new LEVEL is caused only when the LEVEL is determined to have changed definitely. Therefore, even when the detected temperature fluctuates up and down around the temperature threshold, it is possible to achieve stable selecting control of emphasis conversion parameters (LEVEL0-LEVEL2) without causing sharp fluctuations of the emphasis conversion parameters (LEVEL0-LEVEL2) following the temperature fluctuations. Thus, it is possible to improve the image quality of the display image.

Here, in the above embodiments of the present invention, thermistor 37 is used as a means for detecting the temperature of the device interior, but instead of this method, temperature detection may be implemented, by sharing the detection signal output from the temperature detector that is usually provided for the power supply for driving liquid crystal display panel 4, by detecting the drive voltage of the light source provided near liquid crystal display panel 4 so as to use this detection as an indirect temperature detection signal, or by any method.

It is preferable for the temperature detecting means to directly measure the temperature of the liquid crystal display panel 4 surface, but this is difficult in practice. Therefore, the temperature on the driver board is measured and its deviation from the temperature of the liquid crystal display panel 4 surface is compensated for. Specifically, the temperature correlational data between that of the liquid crystal display panel 4 surface and that at the thermistor on the driver board should have been previously taken hold of, and the deviation to the measured temperature on the driver board should be made up for based on the temperature correlational data.

In this case, since the temperature rising curve of the driver board and that of liquid crystal display panel 4 surface from the power activation to the saturation of the temperature of the device interior differ, the data indicating the difference between the temperature rising curves with the passage of the lapse time after the power activation should have been stored in microcomputer 38, and the temperature deviation to be compensated for is variably controlled in accordance with the lapse time, by counting the lapse time after the power activation using a timer incorporated in the microcomputer 38.

Further, though in the description of the above embodiments of the present invention the means for selecting emphasis conversion parameters in accordance with the temperature of the device interior is configured so that three ROMs 3*a* to 3*c* for LEVEL0 to LEVEL2 are provided and one of them can be selected, all the parameters for LEVEL0 to LEVEL2 may be assigned with corresponding addresses and stored in a single ROM 3 as shown in FIG. 12, so that the address to be accessed may be variably controlled based on the parameter control signal from microcomputer 38.

It is also possible to provide a configuration where the emphasis conversion parameters read out from ROM 3 are not switched while the emphasis conversion parameters can be varied by calculations in emphasis converter 52. In this case, control can be made by providing a means for multiplying the emphasis conversion parameters read out from ROM 3 by a coefficient k ($0<k<1$) and making variable control of the value of the coefficient k based on the parameter control signal.

Moreover, in the above embodiments of the present invention, though three levels of the emphasis conversion parameters are provided depending on the temperature of the device interior, obviously the invention should not be limited thereto. It is also obvious that the hysteresis process in the first embodiment and the hysteresis process in the second embodiment may be used in combination so as to achieve more reliable determination and control of the LEVEL selection.

Moreover, in the embodiments of the present invention, the response speed of the liquid crystal display panel is improved by comparing the previous frame image data and the current image data and using the emphasis conversion parameters obtained based on the comparison. However, it is of course possible to provide a configuration in which the emphasis conversion parameters are determined based on image data two frames before or three frames before.

The Third Embodiment

Figure 13:
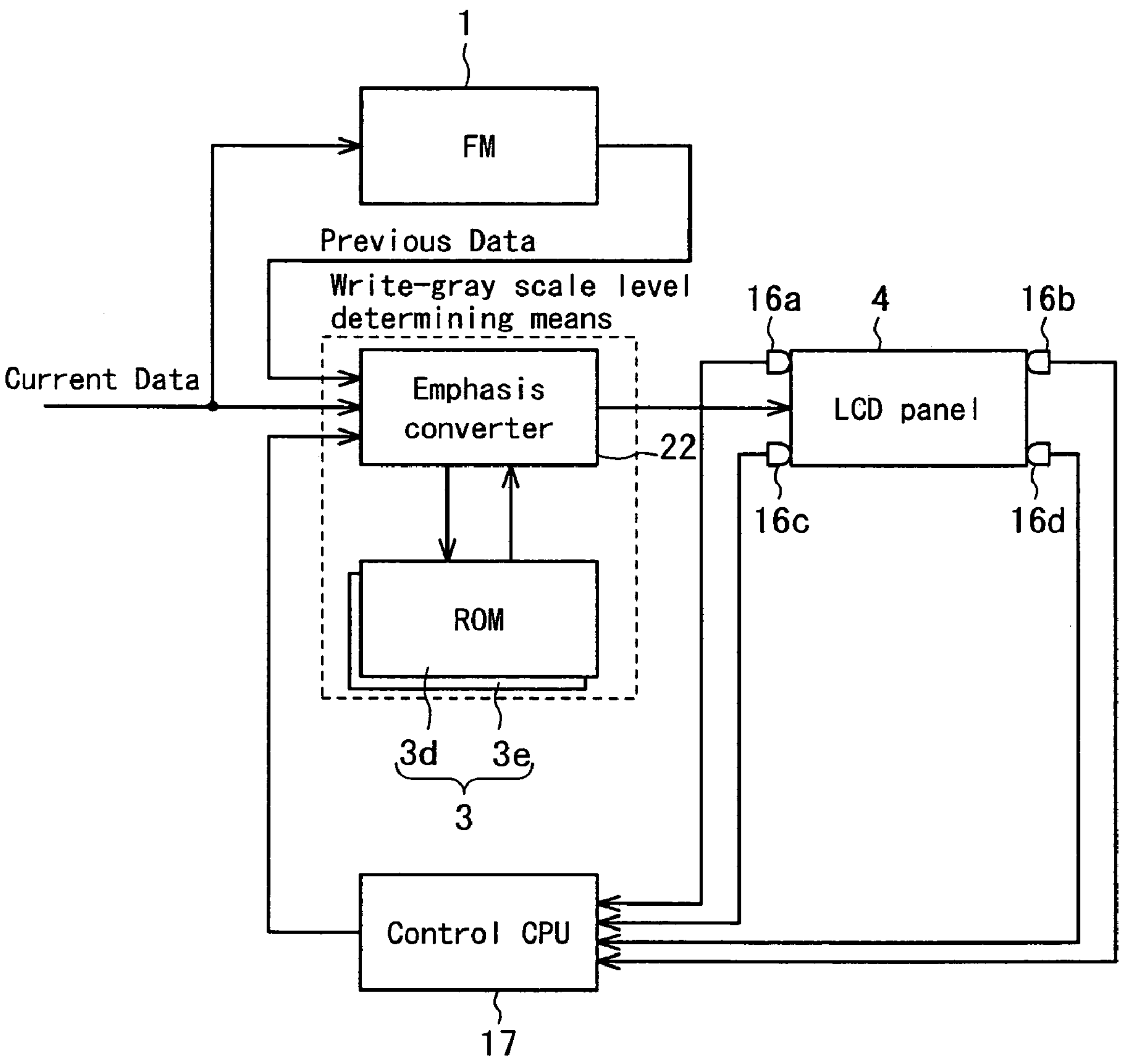
FIG. 13 is a block diagram showing a schematic configuration of essential components in the third embodiment of a liquid crystal display of the present invention.

Next, the third embodiment of the present invention will be described in detail with reference to FIGS. 13 and 14. The same components as those in the conventional example are allotted with the same reference numerals and description for those is omitted. Here, FIG. 13 is a block diagram showing a schematic configuration of essential components in a liquid crystal display of the present embodiment. FIG. 14 includes schematic illustrative charts showing the table contents in table memories used in the liquid crystal display of the present embodiment.

This embodiment, as shown in FIG. 13, includes four temperature sensors 16*a* to 16*d* each detecting the panel temperature of different divided areas of a liquid crystal display panel 4, equally divided into four image areas. Here, the number of area divisions of liquid crystal display panel 4 is not limited to four, but obviously, the whole area may be equally or unequally divided into two or more areas each having an own temperature sensor.

As a write-gray scale level determining means, the embodiment includes: plural table memories 3*d* and 3*e* each storing a different set of emphasis conversion parameters corresponding to the temperature of liquid crystal display panel 4; and an emphasis converter 22 which receives the previous frame image data (Previous Data) stored in a frame memory 1 and the current frame image data (Current Data), reads out corresponding emphasis conversion parameters from either table memory (ROM) 3*d* or 3*e* based on the combinations of the input data (gray scale level transitions) and determines the emphasis converted data for the input data of the current frame so as to compensate the optical response characteristic of liquid crystal display panel 4.

The embodiment further includes a control CPU 17, which, based on the data of temperatures detected by temperature sensors 16*a* to 16*d* as to the divided areas of liquid crystal display panel 4, selects the table memory 3*d* or 3*e*, as appropriate. Accordingly, the divided input image data corresponding to each divided area of liquid crystal display panel 4 is emphasis converted, pixel by pixel, with reference to either table memory (ROM) 3*d* or 3*e*, which is selected by control CPU 17, and supplied to liquid crystal display panel 4.

Here, to make the description simple, as table memory (ROM) 3, the present embodiment will be described taking an example in which two kinds of ROMs as shown in FIG. 14, one for a table memory 3*d* used for LEVEL0 when the detected temperatures of temperature sensors 16*a* to 16*d* are lower than the predetermined threshold temperature and the other for a table memory 3*e* used for LEVEL1 when the detected temperatures of temperature sensors 16*a* to 16*d* are higher than the predetermined threshold temperature, are provided and overshoot drive is implemented by selectively referring to either of them. However, it goes without saying that three or more kinds of ROMs that correspond to three or more predetermined temperature ranges may be used.

Further, though the emphasis conversion parameters (actual measurements) shown in FIG. 14 are stored in 9×9 matrixes of representative gray scale level transition patterns every 32 gray scale levels when the number of display signal levels, i.e., the number of display data is constituted of 8 bits or 256 gray scales, obviously the present invention should not be limited to this.

In the liquid crystal display thus configured, either table memory 3*d* or 3*e* is selected in accordance with the detected temperature obtained through each of temperature sensors 16*a* to 16*d*, and the emphasis conversion parameters corresponding to the gray scale transitions from the previous to current frame are read out with reference to the selected table memory 3*d* or 3*e*. These emphasis conversion parameters are used to implement linear interpolation or other operations so as to determine the emphasis converted data for the input image data for all the gray scale level transition patterns and supply them as the write-gray scale level data to liquid crystal display panel 4.

Figure 1:
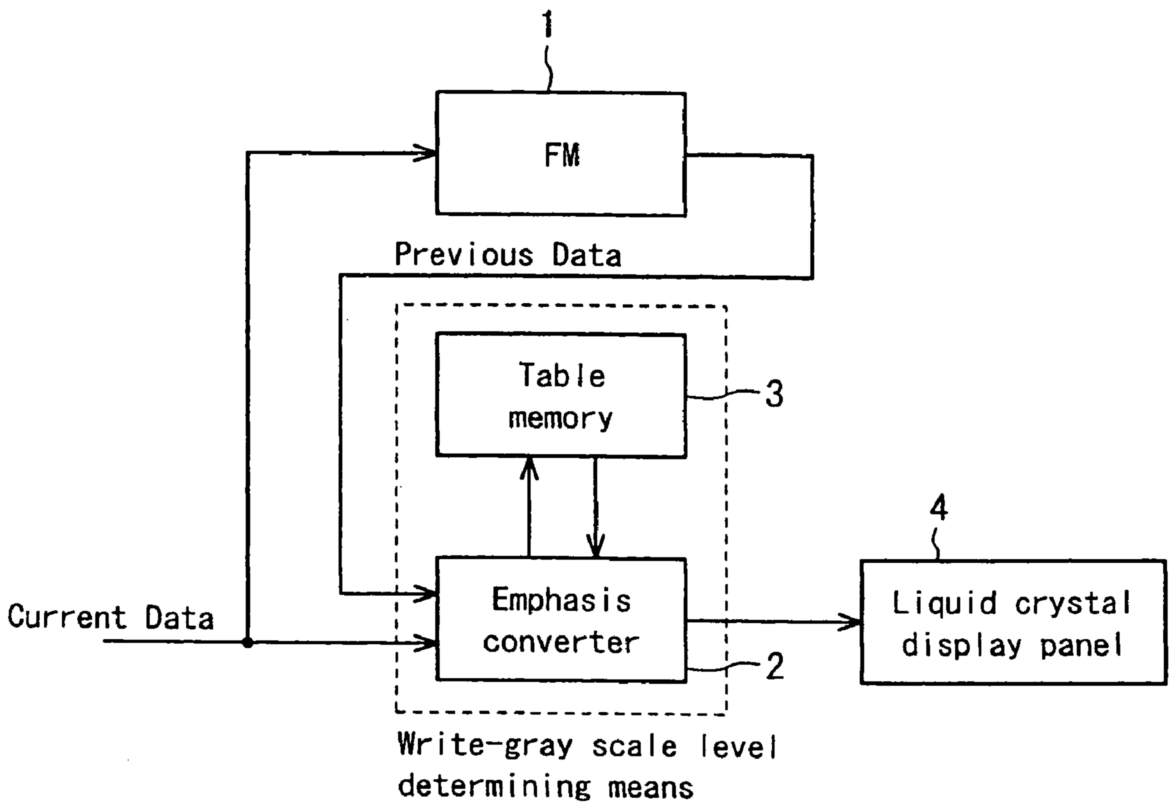
FIG. 1 CONVENTIONAL ART
FIG. 1 is a block diagram showing a schematic configuration of an overshoot drive circuit in a conventional liquid crystal display.
Figure 3:
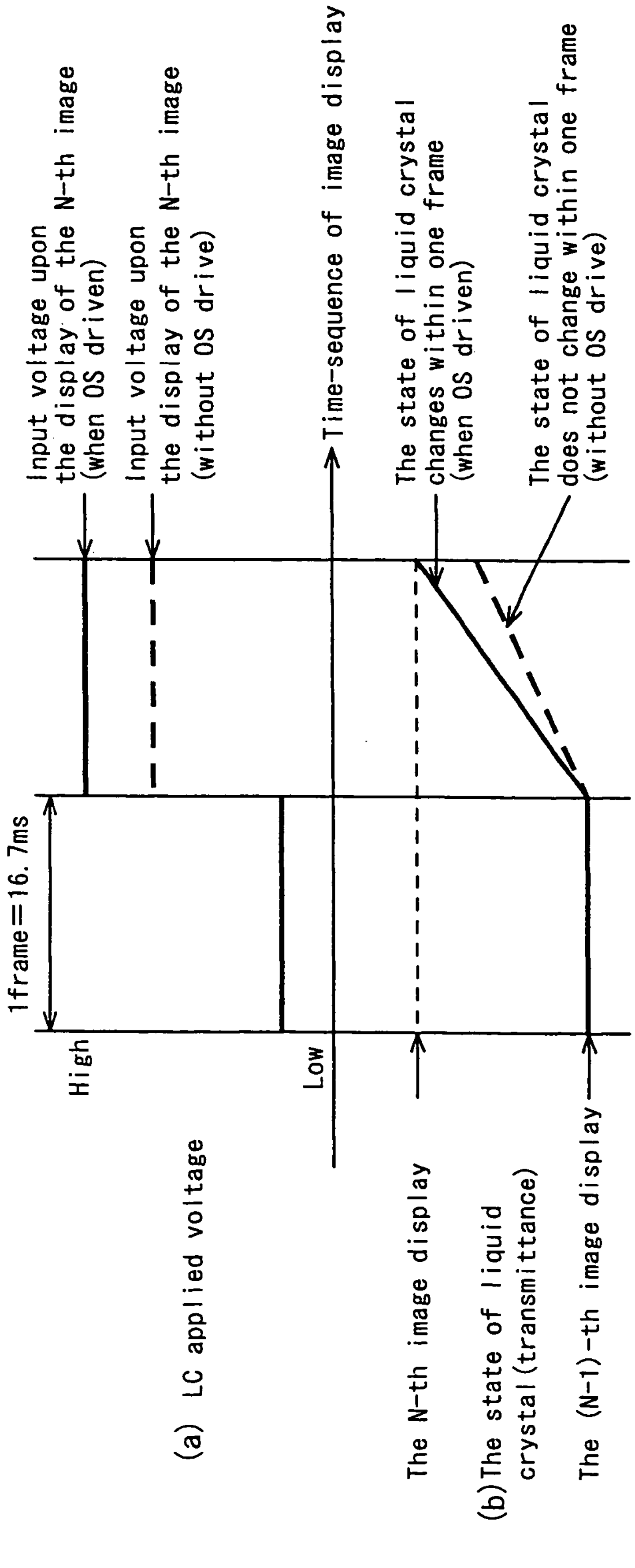
FIG. 3 CONVENTIONAL ART
FIG. 3 is an illustrative view showing the relationship between the voltages applied to liquid crystal and the responses of the liquid crystal.
Figure 4:
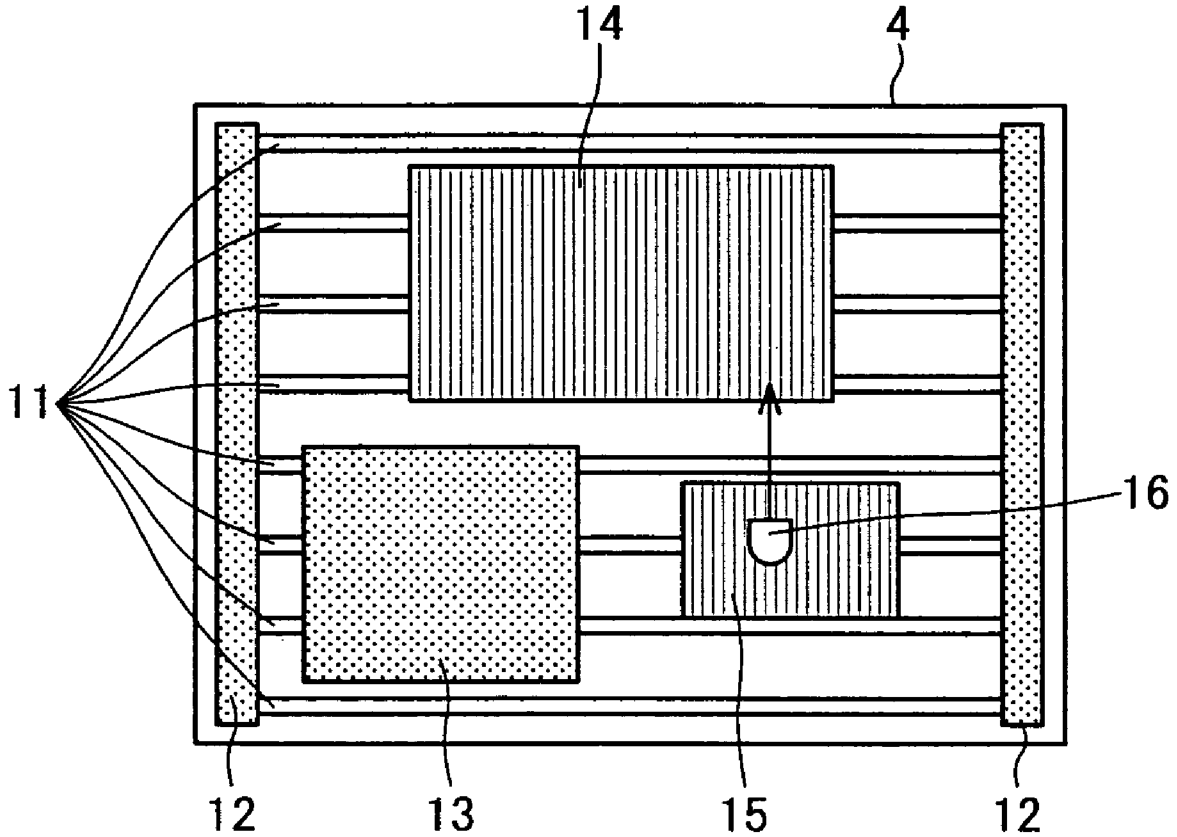
FIG. 4 is an illustrative view showing a schematic configuration example of a direct backlight type liquid crystal display, viewed from the rear side thereof.
Figure 5A:
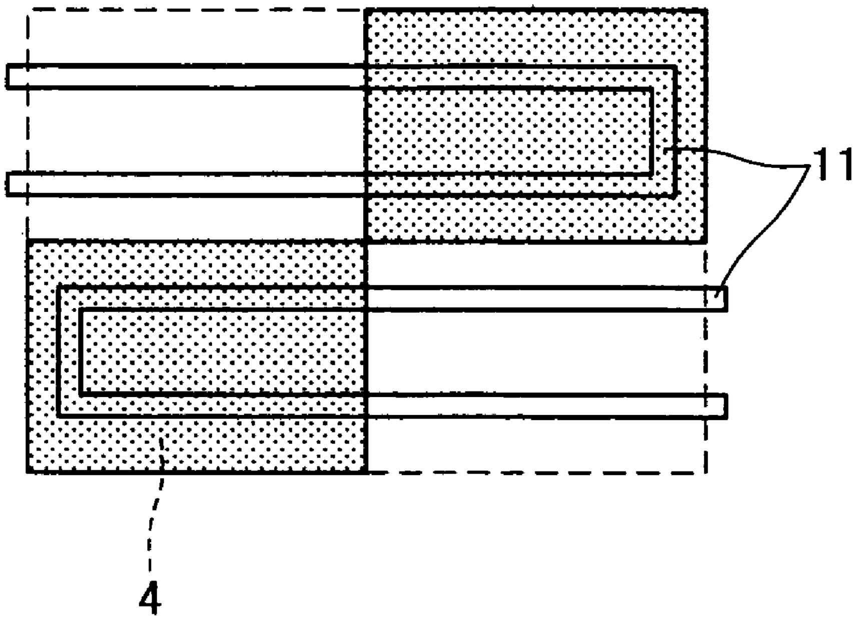
FIG. 5 includes schematic illustrative views, (a) showing a direct backlight type liquid crystal display using U-shaped fluorescent lamps, (b) showing a side-edge backlight type liquid crystal display using L-shaped fluorescent lamps.
Figure 5B:
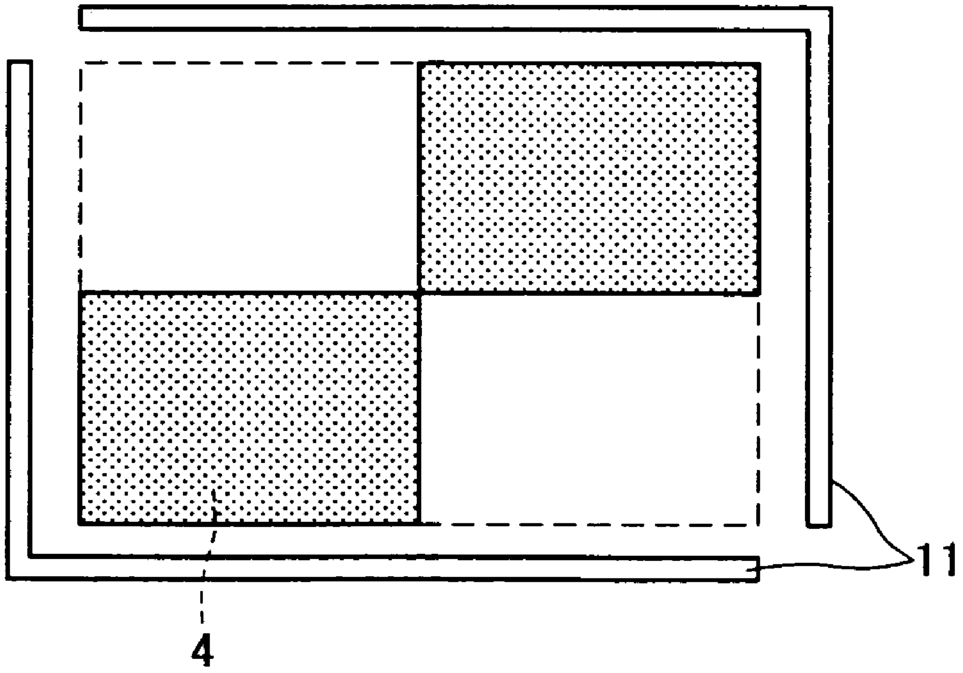

For example, when a varying temperature distribution as shown in FIG. 5 is occurring across the surface of liquid crystal display panel 4, table memory 3*d* for low temperature is chosen for the input image data to be displayed in the hatched areas, where the temperature is relative low, so as to determine emphasis converted data with reference to this table, while table memory 3*e* for high temperature is chosen for the input image data to be displayed in the other areas, where the temperature is relative high, so as to determine emphasis converted data with reference to the latter table.

Thus, it is possible to determine emphasis converted data using different sets of emphasis conversion parameters within one frame (one display image) by selecting one of table memories 3*d* and 3*e* in synchronism with the display position of the input image data on the screen. Accordingly, even if a varying temperature distribution is occurring across the surface of liquid crystal display panel 4, the input image data can be emphasis converted for each section on the screen of liquid crystal display panel 4, in accordance with the detected temperature of that area, whereby it is possible to obtain appropriate write-gray scale level data corresponding to the temperature of each section of the screen, hence compensate the optical response characteristic of liquid crystal display panel 4 across the whole screen.

As a result, it is possible to prevent locally appearing white spots, shadow tailing and the like due to temperature variation across the surface of liquid crystal display panel 4, hence prevent image quality degradation of the display image.

Though in the above third embodiment the write-gray scale level determining means is constituted of emphasis converter 22 and table memory (ROM) 3, a two-dimensional function f(pre, cur) defined by, for instance, two variables, i.e., the gray scale level before transition and the gray scale level after transition, may be provided instead of table memory 3, so as to determine the write-gray scale level data for compensating the optical response characteristic of liquid crystal display panel 4.

The Fourth Embodiment

Figure 15:
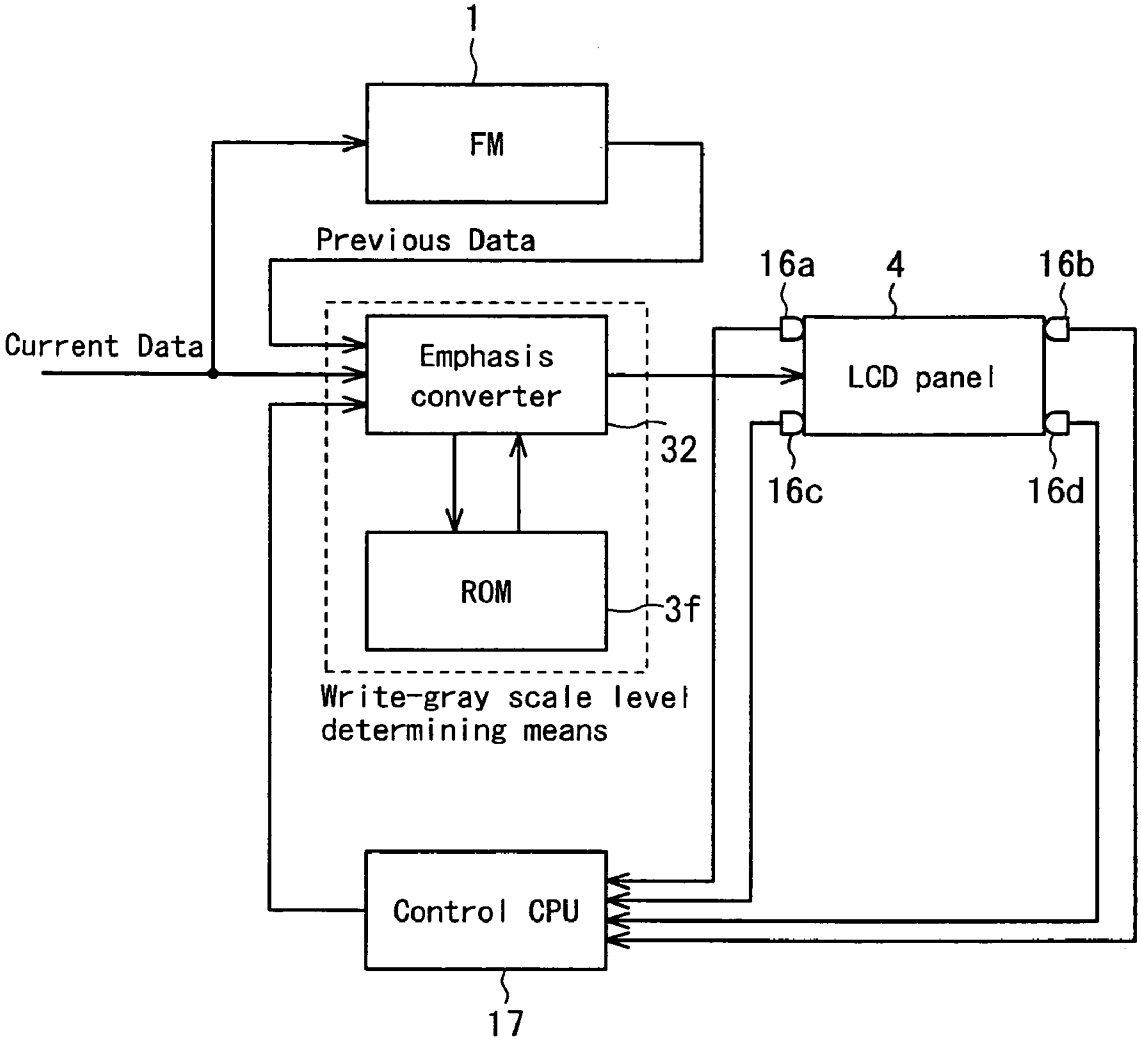
FIG. 15 is a block diagram showing a schematic configuration of essential components in the fourth embodiment of a liquid crystal display of the present invention.

Next, the fourth embodiment of the present invention will be described in detail with reference to FIGS. 15 and 16. The same components as those in the above third embodiment are allotted with the same reference numerals and description for those is omitted. Here, FIG. 15 is a block diagram showing a schematic configuration of essential components in a liquid crystal display of the present embodiment. FIG. 16 is a schematic illustration showing the table content in a table memory used in the liquid crystal display of the present embodiment.

The liquid crystal display of the present embodiment has a single ROM **3*f* for a table memory 3 as shown in FIG. 15, and is configured so that an emphasis converter 32 implements emphasis conversion of the input image data referring to this ROM 3*f* so as to determine the write-gray scale level data to be supplied to liquid crystal display panel 4. Here, the write-gray scale level determining means is constructed of table memory (ROM) 3*f* and emphasis converter 32 which refers the reference table area, in this table memory (ROM) 3*f*, selected in accordance with the control signal from a control CPU 17** and determines write-gray scale level data.

This table memory (ROM) **3*f* stores, as shown in FIG. 16, emphasis conversion parameters for low temperature and emphasis conversion parameters for high temperature in respective table areas (LEVEL0 and LEVEL1). These reference table areas (LEVEL0 and LEVEL1) that store the emphasis conversion parameters are selectively switched and referred to in accordance with the detected temperature obtained through temperature sensors 16*a* to 16*d***.

Specifically, based on the control signal from control CPU 17 in accordance with the detected output from each of temperature sensors **16*a* to 16*d*, one of the table areas (LEVEL0 to LEVEL1**) to be referred to, is variably selected while the emphasis conversion parameters can be read out referring to the address in each table area, in accordance with the gray scale level transition from the previous to current frame, and can be selectively switched between two levels of them in this case. Needless to say, in the present embodiment, three or more classes of emphasis conversion parameters corresponding to the predetermined three or more temperature ranges may be stored in respective reference table areas.

In the liquid crystal display thus configured, one of the reference table areas (LEVEL0 or LEVEL1) in table memory **3*f* is selected in accordance with the detected temperature obtained through each of temperature sensors 16*a* to 16*d*, and the emphasis conversion parameters corresponding to the gray scale transitions from the previous to current frame are read out with reference to the selected reference table area (LEVEL0 or LEVEL1). These emphasis conversion parameters are used to implement linear interpolation or other operations so as to determine the emphasis converted data for the input image data for all the gray scale level transition patterns and supply them as the write-gray scale level data to liquid crystal display panel 4**.

For example, when a varying temperature distribution as shown in FIG. 5 is occurring across the surface of liquid crystal display panel 4, reference table area (LEVEL0) for low temperature is chosen for the input image data to be displayed in the hatched areas, where the temperature is relative low, so as to determine emphasis converted data with reference to this table, while reference table area (LEVEL1) for high temperature is chosen for the input image data to be displayed in the other areas, where the temperature is relative high so as to determine emphasis converted data with reference to the latter table.

Thus, it is possible to determine emphasis converted data using different sets of emphasis conversion parameters within one frame (one display image) by selecting one of the reference table areas (LEVEL0 and LEVEL1) in synchronism with the display position of the input image data on the screen. Accordingly, even if a varying temperature distribution is occurring across the surface of liquid crystal display panel 4, the input image data can be emphasis converted for each section on the screen of liquid crystal display panel 4, in accordance with the detected temperature of that area, whereby it is possible to obtain appropriate write-gray scale level data corresponding to the temperature of each section of the screen, hence compensate the optical response characteristic of liquid crystal display panel 4 across the whole screen.

As a result, it is possible to prevent locally appearing white spots, shadow tailing and the like due to temperature variation across the surface of liquid crystal display panel 4, hence prevent image quality degradation of the display image.

The Fifth Embodiment

Next, the fifth embodiment of the present invention will be described in detail with reference to FIG. 17. The same components as those in the above fourth embodiment are allotted with the same reference numerals and description for those is omitted. Here, FIG. 17 is a block diagram showing a write-gray scale level determining means in a liquid crystal display of the present embodiment.

Figure 17:
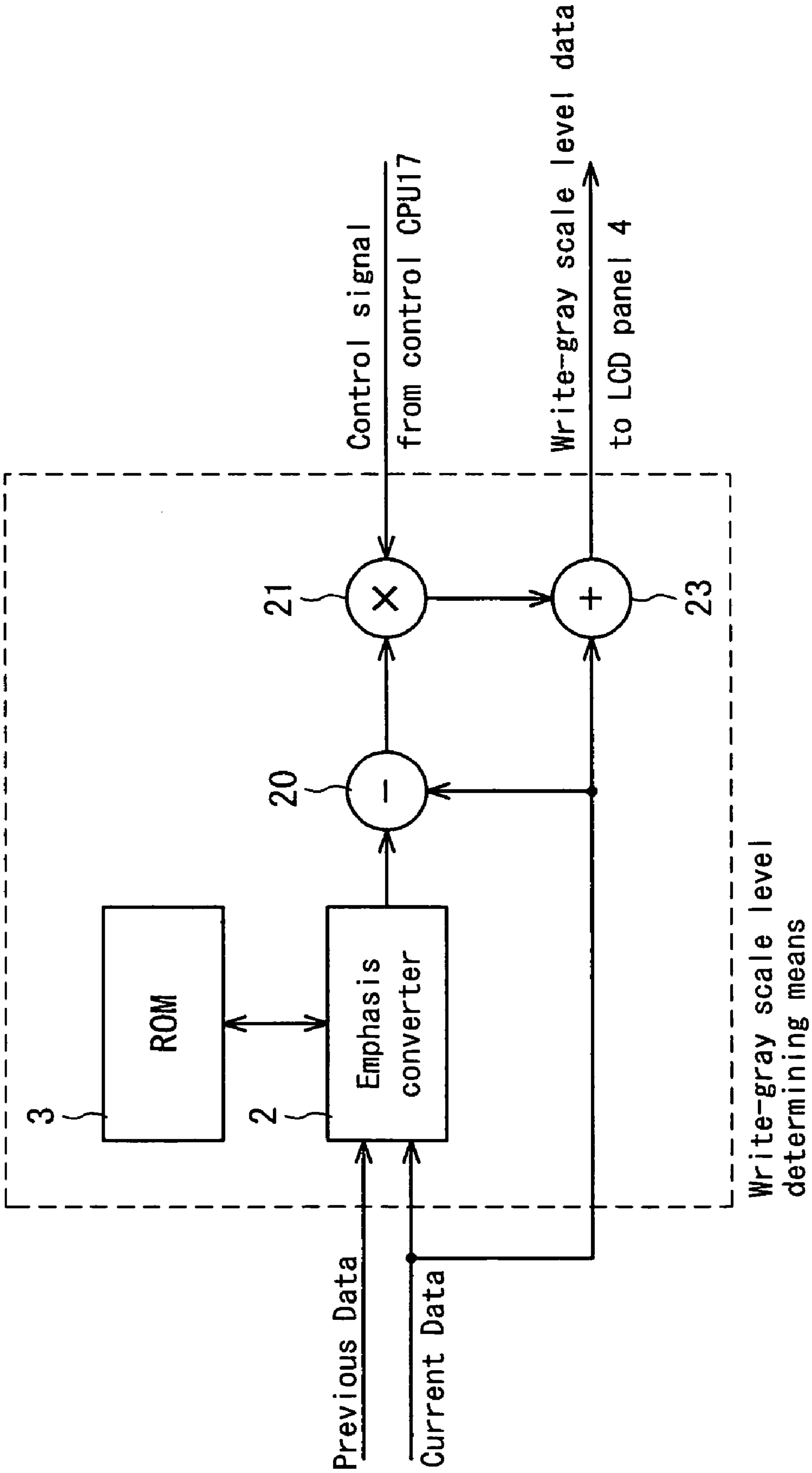
FIG. 17 is a block diagram showing a configurational example of a write-gray scale level means in the fifth embodiment of a liquid crystal display of the present invention.

As shown in FIG. 17 the liquid crystal display of the present embodiment has a write-gray scale level determining means comprised of, for example, an emphasis converter 2 for determining emphasis converted data based on the emphasis conversion parameters read out from a table memory (ROM) 3, a subtracter 20 for subtracting the input image data from the emphasis converted data determined by the emphasis converter 2, a multiplier 21 for multiplying the output signal from the subtracter 20 by a weight coefficient k and adder 23 for adding the output signal from this multiplier 21 to the input image data to produce write-gray scale level data. Based on the control signal from a control CPU 17, the value of the weight coefficient k is controlled so as to vary, to thereby variably control the write-gray scale level data to be supplied to liquid crystal display panel 4.

In the liquid crystal display thus configured, control CPU 17 makes control of varying the weight coefficient $k=1\pm\alpha$ of multiplier 21 for each divided display area of liquid crystal display panel 4 in accordance with the detected temperature obtained from the corresponding temperature sensor **16*a* to 16*d*, whereby it is possible to implement suitable emphasis conversion of the input image data in accordance with a different temperature depending on the display area on the screen of liquid crystal display panel 4**.

For example, when a varying temperature distribution as shown in FIG. 5 is occurring across the surface of liquid crystal display panel 4, the output signal from multiplier 21 with its weight coefficient k set at 1−α is added to the input image data to be displayed in the hatched areas, where the temperature is relative low, while the output signal from multiplier 21 with its weight coefficient k set at 1+α is added to the input image data to be displayed in the other areas, where the temperature is relative high, to thereby variably control the write-gray scale level data to be supplied to liquid crystal display panel 4.

Thus, it is possible to determine the write-gray scale level data processed through different emphasis conversions within one frame (one display image) by variably controlling the weight coefficient k of multiplier 21 in synchronism with the display position of the input image data on the screen. Accordingly, even if a varying temperature distribution is occurring across the surface of liquid crystal display panel 4, the input image data can be processed by variably controlled weight coefficient k for each section on the screen of liquid crystal display panel 4 in accordance with the detected temperature of that area, whereby it is possible to obtain suitable write-gray scale level data corresponding to the temperature of each section of the screen, hence properly compensate the optical response characteristic of liquid crystal display panel 4 across the whole screen.

As a result, it is possible to prevent locally appearing white spots, shadow tailing and the like due to temperature variation across the surface of liquid crystal display panel 4, hence to prevent image quality degradation of the display image.

The Sixth Embodiment

Figure 18:
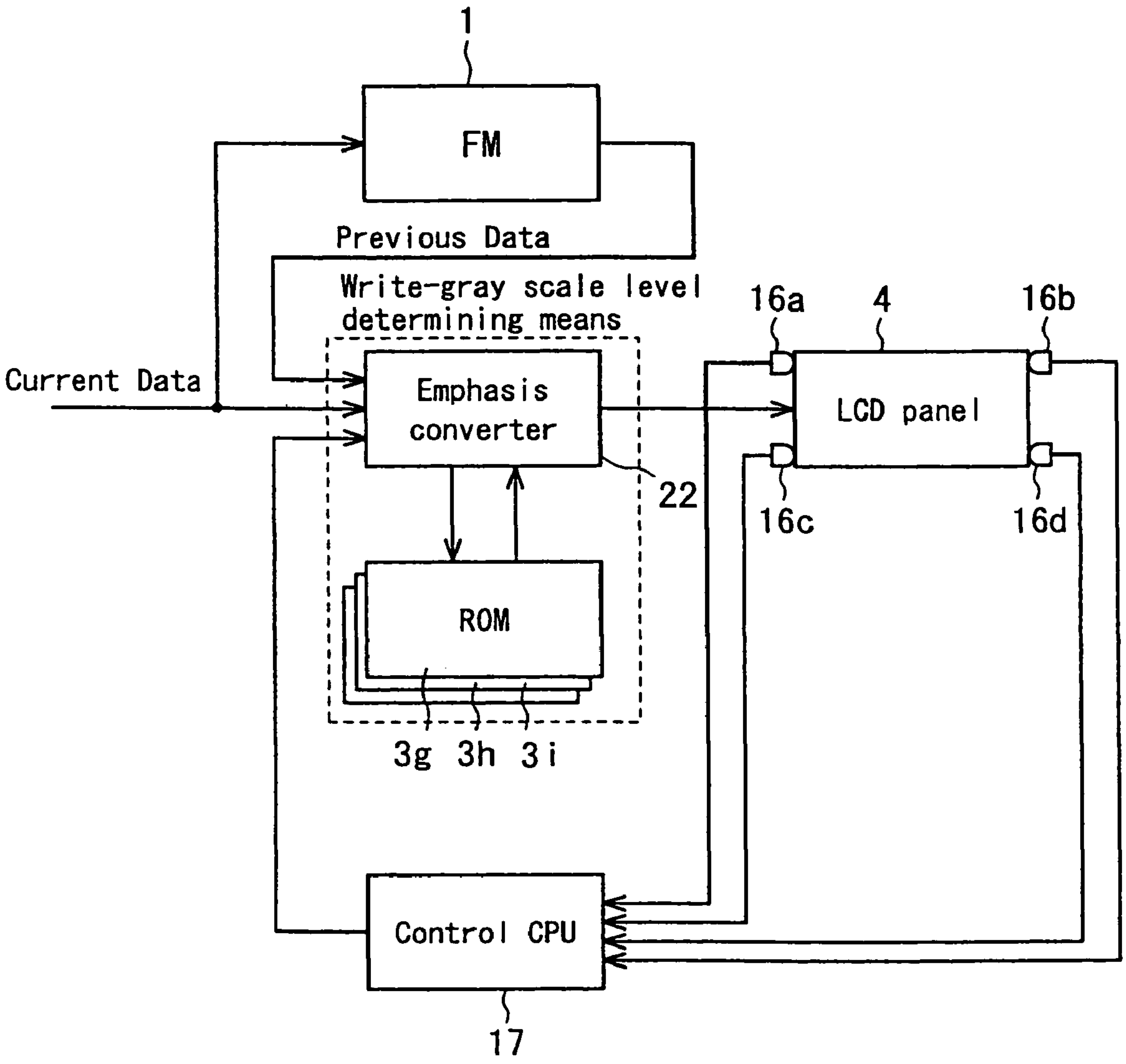
FIG. 18 is a block diagram showing a schematic configuration of essential components in the sixth embodiment of a liquid crystal display of the present invention.
Figure 19:
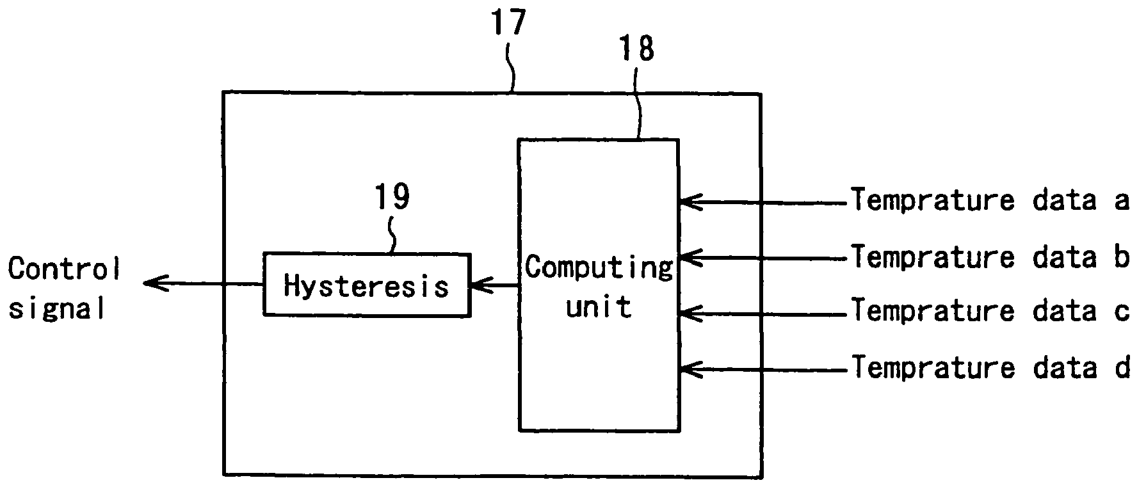
FIG. 19 is a functional block diagram showing a control CPU in the sixth embodiment.
Figure 20:
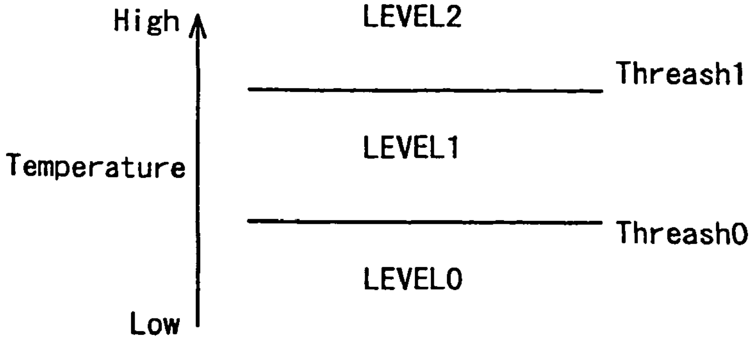
FIG. 20 is an illustrative view showing the relationship between the detected temperature and the emphasis conversion parameter level in the sixth embodiment.
Figure 21:
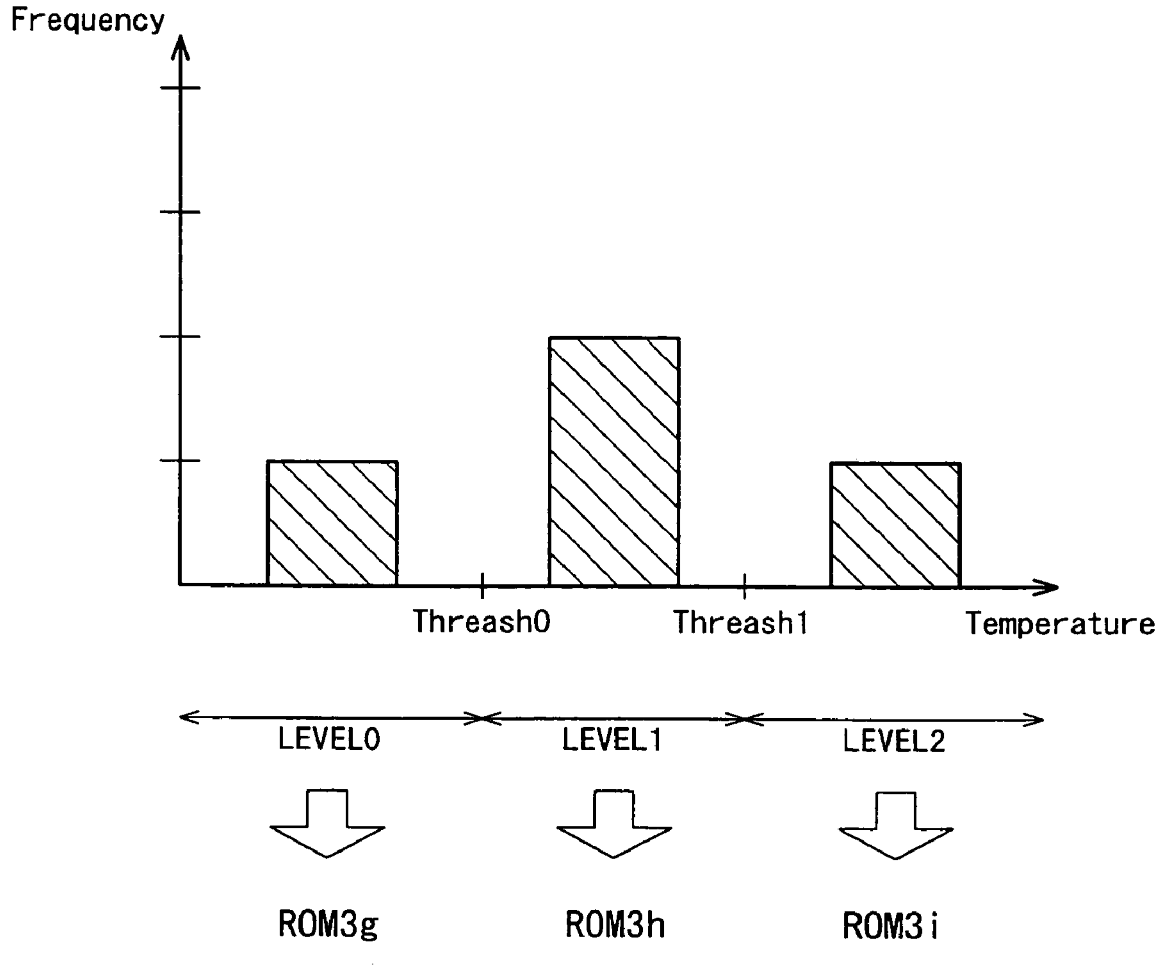
FIG. 21 is an illustrative chart showing a histogram of the detected temperatures in the sixth embodiment.

Next, the sixth embodiment of the present invention will be described in detail with reference to FIGS. 18 to 21. The same components as those in the conventional example are allotted with the same reference numerals and description for those is omitted. Here, FIG. 18 is a block diagram showing a schematic configuration of essential components in a liquid crystal display of the present embodiment; FIG. 19 is a functional block diagram showing a control CPU in the liquid crystal display of the present embodiment; FIG. 20 is an illustrative view showing the relationship between the detected temperature and the emphasis conversion parameter level in the liquid crystal display of the present embodiment; and FIG. 21 is an illustrative chart showing a histogram of the detected temperatures in the liquid crystal display of the present embodiment.

The liquid crystal display of this embodiment, as shown in FIG. 18, includes four temperature sensors 16*a* to 16*d* detecting the panel temperatures of different divided areas of a liquid crystal display panel 4, equally divided into four image areas. Here, the number of area divisions of liquid crystal display panel 4 is not limited to four, but needless to say, the whole area may be equally or unequally divided into two or more areas each having respective temperature sensors.

As a write-gray scale level determining means, the embodiment includes: plural table memories 3*g* to 3*i* each storing a different set of emphasis conversion parameters corresponding to the temperature characteristic of liquid crystal display panel 4; and an emphasis converter 22 which receives the previous frame image data (Previous Data) stored in a frame memory 1 and the current frame image data (Current Data), reads out corresponding emphasis conversion parameters from one of table memories (ROMs) 3*g* to 3*i* based on the combinations of the input image data (gray scale level transitions) and determines the emphasis converted data for the input image data of the current frame so as to compensate the optical response characteristic of liquid crystal display panel 4.

The embodiment further includes a control CPU 17, which based on the data of temperatures detected by the aforementioned temperature sensors 16*a* to 16*d* as to the divided areas of liquid crystal display panel 4, makes an appropriate selection of one of the table memories 3*g* to 3*i*. This control CPU 17 includes: as shown in FIG. 19, a computing unit 18 for implementing the predetermined calculation on the detected temperature data a to d from temperature sensors 16*a* to 16*d*; and a hysteresis processor 19 for applying a hysteresis process to the computed output data from the computing unit 18 to stably generate a control signal for selection and control of the above table memories 3*g* to 3*i*.

Accordingly, in the present embodiment, it is possible to control the selection of one of table memories (ROMs) 3*g* to 3*i* in frame unit in response to the control signal generated from control CPU 17. That is, the input image data is emphasis converted using the emphasis conversion parameters which are appropriately switched based on the selected one of table memories (ROMs) 3*g* to 3*i*, so that the thus converted data can be supplied as the write-gray scale level data to liquid crystal display panel 4.

Here, to make the description simple, the present embodiment will be described with regard an overshoot drive scheme in which three kinds ROMs, one for table memory 3*g* that stores emphasis conversion parameters (LEVEL0) used when the detected temperature of liquid crystal display panel 4 is lower than the first predetermined threshold temperature (Threash0), one for table memory 3*h* that stores emphasis conversion parameters (LEVEL1) used when the detected temperature of liquid crystal display panel 4 falls between the first predetermined threshold temperature (Threash0) and the second predetermined threshold temperature (Threash1), and one for table memory 3*i* that stores emphasis conversion parameters (LEVEL2) used when the detected temperature of liquid crystal display panel 4 is higher than the second predetermined threshold temperature (Threash1), are provided, and overshoot control is implemented by selecting one of them. However, it goes without saying that four or more kinds of ROMs that correspond to four or more predetermined temperature ranges may be used.

When the number of display signal levels, or the number of display data, is of 8 bits or 256 gray scales, each table memory (ROM) 3*g*-3*i* can hold the emphasis conversion parameters for all the 256 gray scale levels. Alternatively, each table memory may store the emphasis conversion parameters for only nine representative gray scale levels taken at intervals of 32 gray scale levels or for only five representative gray scale levels taken at intervals of 64 gray scale levels, wherein the emphasis converted data (write-gray scale level data) for other gray scale level transitions can be determined from the above emphasis conversion parameters by linear interpolation or other operations.

In the liquid crystal display thus configured, control CPU 17 generates a control signal for selecting the emphasis conversion parameters, based on the detected temperature data a to d obtained from temperature sensors 16*a* to 16*d*, and one of table memories 3*g* to 3*i* is selected based on the control signal appropriately for every frame.

Then, with reference to the thus selected one of table memories 3*g* to 3*i*, the emphasis conversion parameters corresponding to the gray scale transitions from the previous to current frame are read out. These emphasis conversion parameters are used to implement linear interpolation or other operations so as to determine the emphasis converted data for the input image data for all the gray scale level transition patterns and supply them as the write-gray scale level data to liquid crystal display panel 4.

In the present embodiment, in order to select suitable emphasis conversion parameters in response to a varying temperature distribution occurring across the screen of liquid crystal display panel 4 depending on the positions of heat generating components or the installed state of the device, the control signal for selecting the emphasis conversion parameters is determined by making computing unit 18 of control CPU 17 implement the following operations for detected temperature data a to d from temperature sensors 16*a* to 16*d*.

(1) Mean Value

The mean value of detected temperature data a to d from temperature sensors 16*a* to 16*d* is determined and this value is used as the control signal for selecting the emphasis conversion parameters. Thus, the mean value of detected temperature data a to d is used to implement selecting control of emphasis conversion parameters, so that it is possible to select suitable emphasis conversion parameters for the whole screen even if there are local sharp temperature variations across liquid crystal display panel 4.

(2) Maximum Value

The maximum value of detected temperature data a to d from temperature sensors 16*a* to 16*d* is determined and this value is used as the control signal for selecting the emphasis conversion parameters. Thus, the maximum value of detected temperature data a to d is used to implement selecting control of the emphasis conversion parameters, so that it is possible to prevent occurrence of white spots (in the case of the normally black mode) and other defects due to a choice of excessive emphasis conversion parameters even when some low-temperature areas are locally present within liquid crystal display panel 4.

(3) Minimum Value

The minimum value of detected temperature data a to d from temperature sensors 16*a* to 16*d* is determined and this value is used as the control signal for selecting the emphasis conversion parameters. Thus, the minimum value of detected temperature data a to d is used to implement selecting control of the emphasis conversion parameters, so that it is possible to prevent occurrence of shadow tailing (in the case of the normally black mode) and other defects due to a choice of underestimate emphasis conversion parameters even when some high-temperature areas are locally present within liquid crystal display panel 4.

(4) Histogram (Majority Decision)

The frequency distribution (histogram) of detected temperature data a to d from temperature sensors 16*a* to 16*d* is determined so that the control signal for selecting the emphasis conversion parameters is determined in accordance with the temperature range which appears most frequently. For example, as shown in FIG. 21, if the detected temperatures of data a to d are distributed most between the first threshold temperature (Threash0) and the second threshold (Threash1), the control signal that selects the emphasis conversion parameters (LEVEL1) is output under majority rule.

Thus, the histogram of detected temperature data a to d is used to generate a control signal corresponding to the temperature detected most frequently across the screen, based on which switching control of emphasis conversion parameters is carried out. Accordingly, it is possible to select the optimal emphasis conversion parameters for the majority of image areas even when there are local temperature variations within liquid crystal display panel 4.

(5) Weighted Mean

Detected temperatures of data a to d from temperature sensors 16*a* to 16*d* are multiplied by respective predetermined weight coefficients l to o, and the products are summed (a×l+b×m+c×n+d×o). The result is divided by the sum of the weight coefficients (l+m+n+o) to give the weighted mean. This is used as the control signal for selecting the emphasis conversion parameters.

Thus, the weighted mean of detected temperature data a to d is used to implement switching control of the emphasis conversion parameters, so that it is possible to select the emphasis conversion parameters suitable for the desired image areas.

Here, the above weight coefficients l to o may be values that can be varied in accordance with various conditions such as a characteristic quantity of the input image data and/or the installed state of the device or may be set arbitrarily by the user. Further, on the basis that notable images must be displayed in the center of the screen, the weight coefficient for the detected temperature data in the center of the screen may be set greater than others.

(6) Selective Extraction

From detected temperature data a to d from temperature sensors 16*a* to 16*d*, only part of detected temperature data from the predetermined temperature sensor is selected and extracted, and this is used as the control signal for selecting the emphasis conversion parameters. Thus, only partial data of detected temperature data a to d is used to implement switching control of emphasis conversion parameters, so that it is possible to select suitable emphasis conversion parameters for the desired screen area even if there are local temperature variations across liquid crystal display panel 4.

Here, which temperature sensor from temperature sensors 16*a* to 16*d* should be selected to extract the detected temperature data may be selectively set up in accordance with various conditions such as a characteristic quantity of the input image data and/or the installed state of the device, or may be set arbitrarily by the user.

It is of course possible to select one of the above calculating schemes (1) to (6) as appropriate or use them in appropriate combination to obtain the control signal, in accordance with various conditions such as a characteristic quantity of the input image data and/or the installed state of the device, or based on the command input from the user.

It should be noted that hysteresis processor 19 in control CPU 17 implements the process of stabilizing the control signal when, for example, the detected temperature of the device interior is unstable and hence the calculated output from computing unit 18 sharply varies (fluctuates violently), so that the signal will not follow such a fluctuation. Thereby, it is possible to make selecting control of emphasis conversion parameters in a stable manner, hence improve the image quality of the display image.

As stated above, in the liquid crystal display of the present embodiment, temperature sensors 16*a* to 16*d* for detecting the temperatures at multiple positions within the screen of liquid crystal display panel 4 are provided. The detected temperature data from these temperature sensors 16*a* to 16*d* are subjected to predetermined calculation so as to generate a control signal for switching the emphasis conversion parameters between multiple classes corresponding to the temperature ranges. Accordingly, it is possible to select suitable emphasis conversion parameters at any time even when a varying temperature distribution is occurring across liquid crystal display panel 4, whereby it is possible to prevent generation of white spots, generation of shadow tailing and the like and prevent image quality degradation of the display image.

Though in the above sixth embodiment the write-gray scale level determining means is constituted of emphasis converter 2 and table memories (ROMs) 3*g* to 3*i*, a two-dimensional function f (pre, cur) defined by, for instance, two variables, i.e., the gray scale level before transition and the gray scale level after transition, may be provided instead of table memories 3*g* to 3*i*, so as to determine the write-gray scale level data for compensating the optical response characteristic of liquid crystal display panel 4.

The Seventh Embodiment

Figure 22:
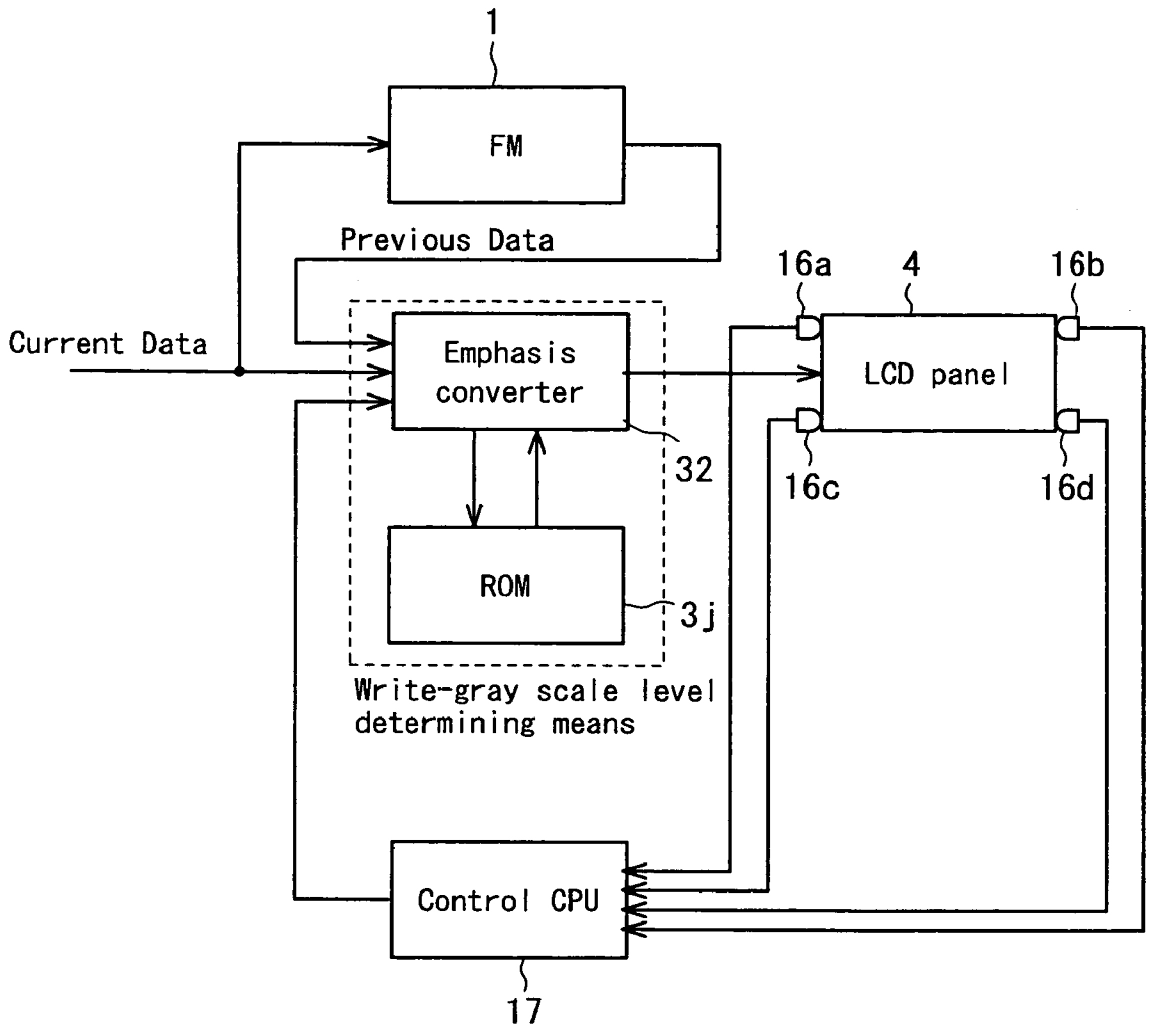
FIG. 22 is a block diagram showing a schematic configuration of essential components in the seventh embodiment of a liquid crystal display of the present invention.

Next, the seventh embodiment of the present invention will be described in detail with reference to FIGS. 22 and 23. The same components as those in the above sixth embodiment are allotted with the same reference numerals and description for those is omitted. Here, FIG. 22 is a block diagram showing a schematic configuration of essential components in a liquid crystal display of the present embodiment. FIG. 23 is a schematic illustration showing the table content in a table memory used in the liquid crystal display of the present embodiment.

The liquid crystal display of the present embodiment has a single ROM 3*j* as a table memory as shown in FIG. 22 and is configured so that an emphasis converter 32 implements emphasis conversion of the input image data referring to this ROM 3*j* so as to determine the write-gray scale level data to be supplied to liquid crystal display panel 4. Here, the write-gray scale level determining means is constructed of table memory (ROM) 3*j* and emphasis converter 32 which refers the reference table area, in this table memory (ROM) 3*j*, selected in accordance with the control signal from a control CPU 17 and determines write-gray scale level data.

This table memory (ROM) 3*j* stores, as shown in FIG. 23, emphasis conversion parameters (LEVEL0) for the temperature not higher than the first threshold temperature (Theash0), emphasis conversion parameters (LEVEL1) for the temperature between the first threshold temperature (Theash0) and the second threshold temperature (Threash1), and emphasis conversion parameters (LEVEL2) for the temperature not lower than the second threshold temperature (Theash1).

These reference table areas that store respective sets of emphasis conversion parameters are selectively switched and referred to in accordance with the control signal based on the detected temperature obtained through temperature sensors 16*a* to 16*d*. Specifically, based on the control signal from control CPU 17, one of the table areas (LEVEL0 to LEVEL2) to be referred to, is selected while the emphasis conversion parameters can be read out referring to the address in the selected table area, in accordance with the gray scale level transition from the previous to current frame, and can be selectively switched between any one of the three levels in this case.

Needless to say, in this present embodiment also, four or more classes of emphasis conversion parameters corresponding to the predetermined four or more temperature ranges may be stored in respective reference table areas.

In the liquid crystal display thus configured, the detected temperatures obtained from multiple temperature sensors 16*a* to 16*d* are processed by predetermined computation to determine a control signal, whereby one of the reference table areas (LEVEL0 or LEVEL2) in table memory 3*j* is selected and referred to, so that the emphasis conversion parameters corresponding to the gray scale transitions from the previous to current frame are read out. These emphasis conversion parameters are used to implement linear interpolation or other operations so as to determine the emphasis converted data for the input image data for all the gray scale level transition patterns and supply them as the write-gray scale level data to liquid crystal display panel 4.

Accordingly, it is possible to select suitable emphasis conversion parameters at any time even when a varying temperature distribution is occurring across liquid crystal display panel 4, whereby it is possible to properly compensate the optical response characteristic of liquid crystal display panel 4 and prevent generation of white spots, generation of shadow tailing and the like, thus preventing image quality degradation of the display image.

The Eighth Embodiment

Next, the eighth embodiment of the present invention will be described in detail with reference to FIG. 24. The same components as those in the above sixth embodiment are allotted with the same reference numerals and description for those is omitted. Here, FIG. 24 is a block diagram showing a write-gray scale level determining means in a liquid crystal display of the present embodiment.

Figure 24:
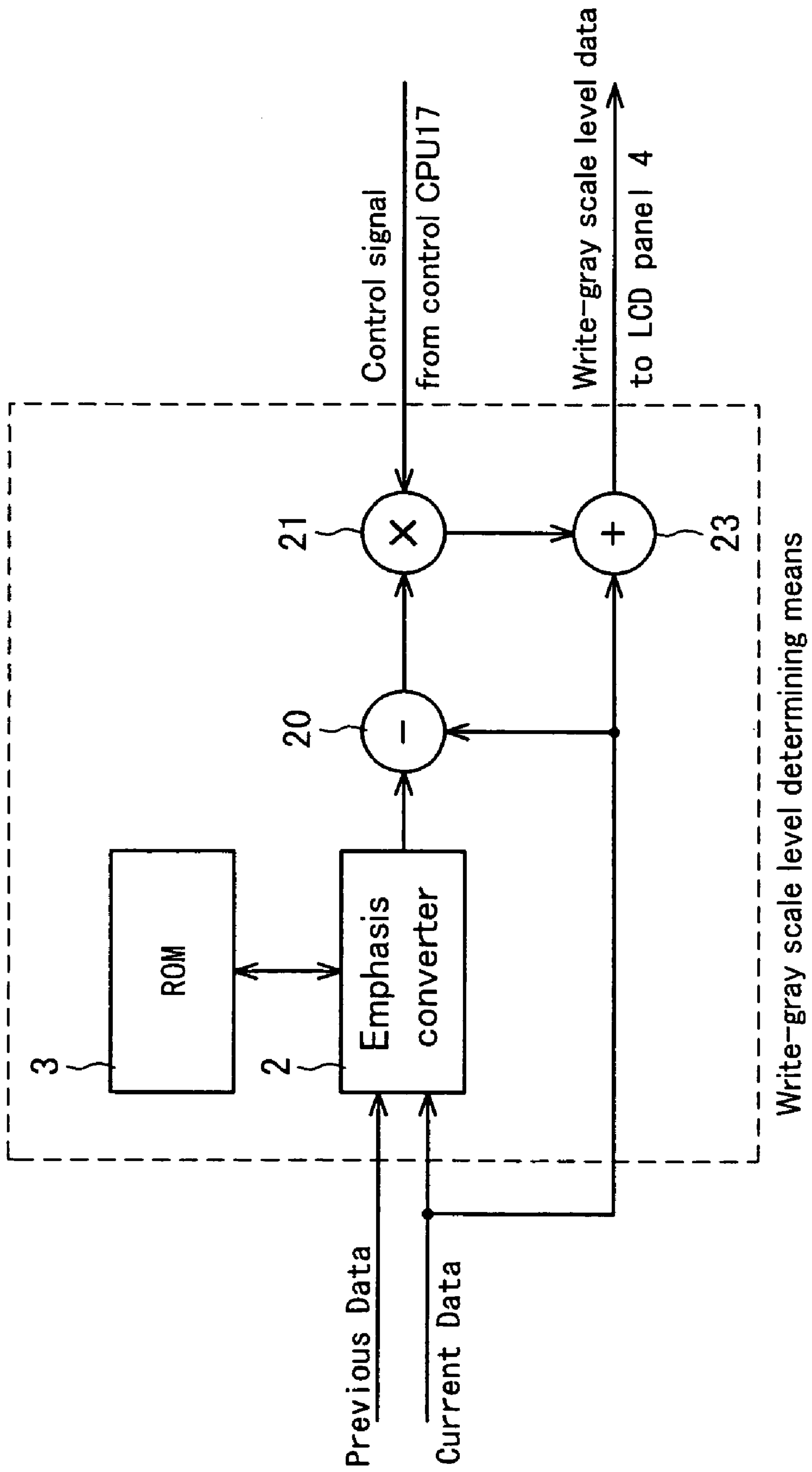
FIG. 24 is a block diagram showing a configurational example of a write-gray scale level means in the eighth embodiment of a liquid crystal display of the present invention.

As shown in FIG. 24 the liquid crystal display of the present embodiment has a write-gray scale level determining means comprised of, for example, an emphasis converter 2 for determining emphasis converted data based on the emphasis conversion parameters read out from a table memory (ROM) 3, a subtracter 20 for subtracting the input image data from the emphasis converted data determined by the emphasis converter 2, a multiplier 21 for multiplying the output signal from the subtracter 20 by a weight coefficient k and adder 23 for adding the output signal from this multiplier 21 to the input image data to produce write-gray scale level data. Based on the control signal from a control CPU 17, the value of the weight coefficient k is controlled so as to vary, to thereby variably control the write-gray scale level data to be supplied to liquid crystal display panel 4.

In the liquid crystal display thus configured, control CPU 17 processes the detected temperature data from temperature sensors 16*a* to 16*d* through the predetermined computation so as to determine the control signal, and based on this control signal, makes control of varying the weight coefficient $k=1\pm\alpha$ of multiplier 21 for every frame, whereby it is possible to implement suitable emphasis conversion of the input image data. As a result, it is possible to properly compensate the optical response characteristic of liquid crystal display panel 4 and prevent generation of white spots, generation of shadow tailing and the like, thus preventing image quality degradation of the display image.

The Ninth Embodiment

Next, the ninth embodiment of the present invention will be described in detail with reference to FIG. 25. The same components as those in the above sixth and seventh embodiments are allotted with the same reference numerals and description for those is omitted. Here, FIG. 25 is a block diagram showing a schematic configuration of essential components in a liquid crystal display of the present embodiment.

Figure 25:
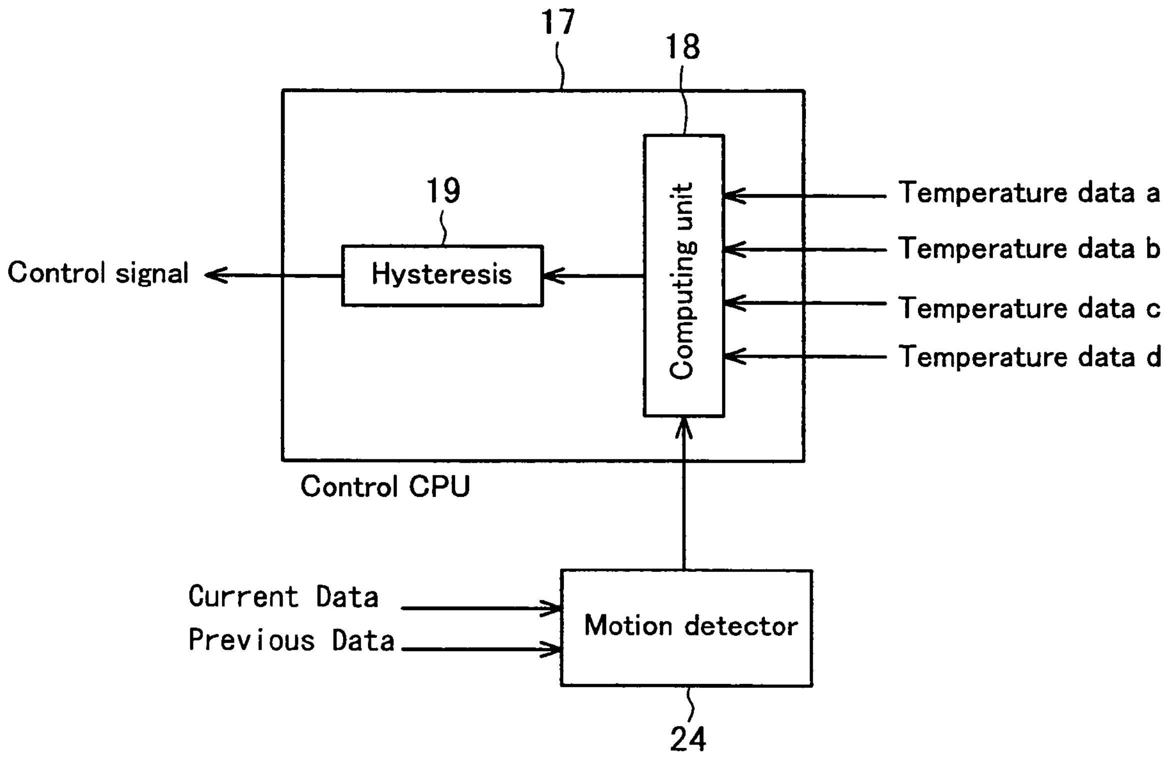
FIG. 25 is a block diagram showing a schematic configuration of essential components in the ninth embodiment of a liquid crystal display of the present invention.

The liquid crystal display of this embodiment, as shown in FIG. 25, includes a motion detector 24 for detecting the amount of motion of the input image data from the previous to the current frame as a characteristic quantity of input image data, and is configured so as to variably control the computing process in a computing unit 18 of a control CPU 17 based on the result of the detected motion.

Illustratively, for a still image or an image with little motion, no afterglow, tailing or other image degradation due to optical response characteristic of the liquid crystal display panel 4 will take place without regard to the temperature of liquid crystal display panel 4. Therefore, in order to achieve the optimal emphasis conversion for the input image data of which a motion greater than the predetermined level is detected by motion detector 24, a control signal for selection of emphasis conversion parameters is produced by sampling only the temperature data that corresponds to the image areas in which the image includes large motion, or by weighting and calculating the weighted average.

For example, when a motion picture of a wide aspect ratio of 16:9 is displayed on a liquid crystal display panel having an aspect ratio of 4:3, the original image is displayed in the center of the frame of the liquid crystal display panel with black borders presented at the top and bottom thereof (black data is written into the non-image areas). In this case, the control signal is generated based on only the detected temperature data from one or plural temperature detecting sensors corresponding to the video display area (motion picture displayed area) in the center of the screen of the liquid crystal display panel so that the switching control can be implemented without reference to the detected temperature data from the temperature detecting sensors that correspond to the black borders (still image display areas) displayed at the top and bottom.

Similarly, the control signal can also be generated by assigning great weight coefficients to the detected temperature data from one or plural temperature detecting sensors corresponding to the video display area (motion picture displayed area) in the center of the screen of the liquid crystal display panel and small weight coefficients to the detected temperature data from the temperature detecting sensors that correspond to the black borders (still image display areas) displayed at the top and bottom and calculating the weighted average.

As described above, according to the liquid crystal display of the present embodiment, it is possible to positively prevent generation of afterglow and tailing within the whole frame by using the detected temperature data for the video display portion (image area) with motions to select the preferable emphasis conversion parameters.

Though the present embodiment was described using a configuration in which the amount of motion of the input image data is used as one example of the characteristic quantity of the input image data, it is also possible to generate a control signal for making selection of suitable emphasis conversion parameters, by extracting only the temperature data from one or plural suitable temperature detecting sensors or weighting them, based on the features for each display image area such as noise quantity, edge quantity, gray scale level transition patterns, etc. contained in the input image data.

Further, it is also possible to provide a configuration in which more preferable emphasis conversion parameters can be selected by determining the control signal by appropriately selecting one of the above calculating algorithms (1) to (6) in the sixth embodiment or using a combination thereof.

The Tenth Embodiment

Next, the tenth embodiment of the present invention will be described in detail with reference to FIG. 26. The same components as those in the above sixth and seventh embodiments are allotted with the same reference numerals and description for those is omitted. Here, FIG. 26 is a block diagram showing a schematic configuration of essential components in a liquid crystal display of the present embodiment.

Figure 26:
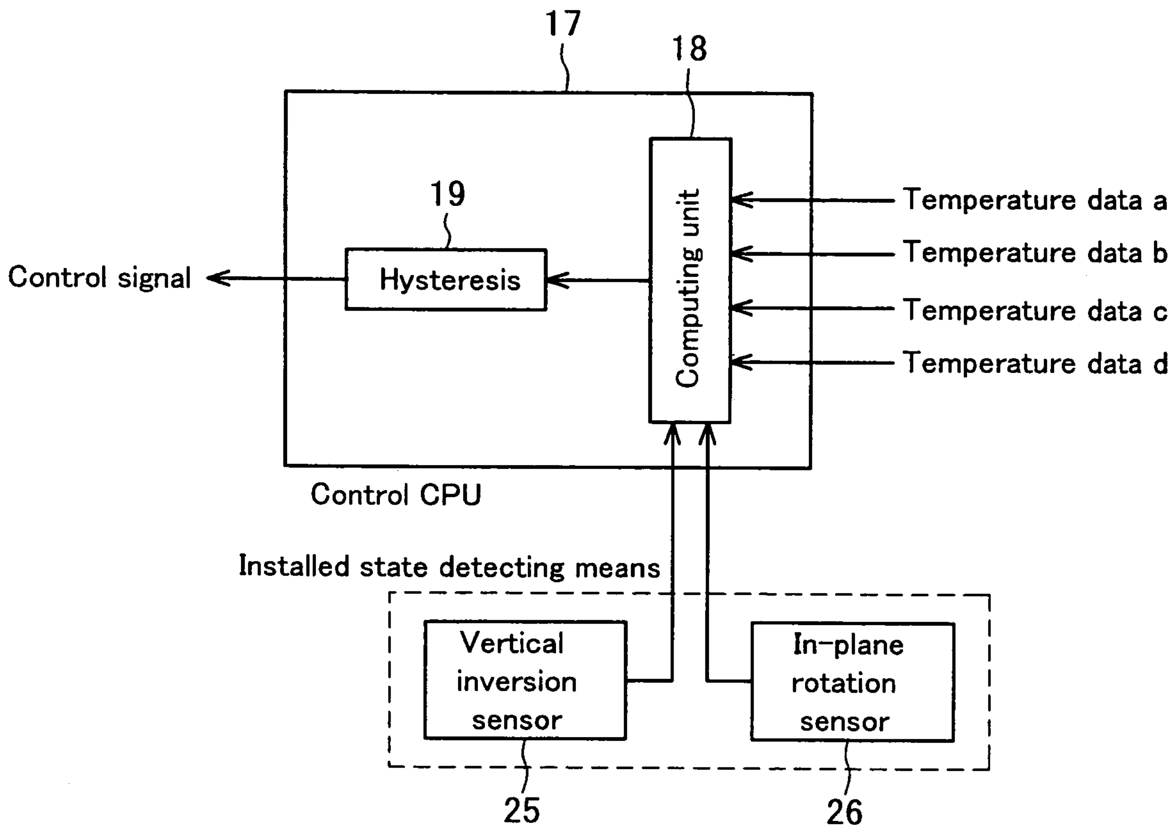
FIG. 26 is a block diagram showing a schematic configuration of essential components in the tenth embodiment of a liquid crystal display of the present invention.

The liquid crystal display of the present embodiment includes, as shown in FIG. 26, as the means for detecting the state of installation of the device, a vertical inversion sensor 25 for detecting vertical inversion of liquid crystal display panel 4 and an in-plane rotation sensor 26 for detecting the in-plane rotated state of liquid crystal display panel 4, and is configures so that the computing process in computing unit 18 in control CPU 17 is controlled in a variable manner based on these detected results.

Figure 6A:
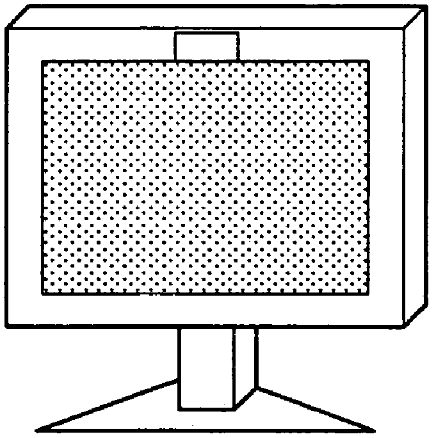
FIG. 6 includes illustrative views of a liquid crystal display, (a) normal installed state, (b) vertically inverted state and (c) 90 degree rotated state.
Figure 6B:
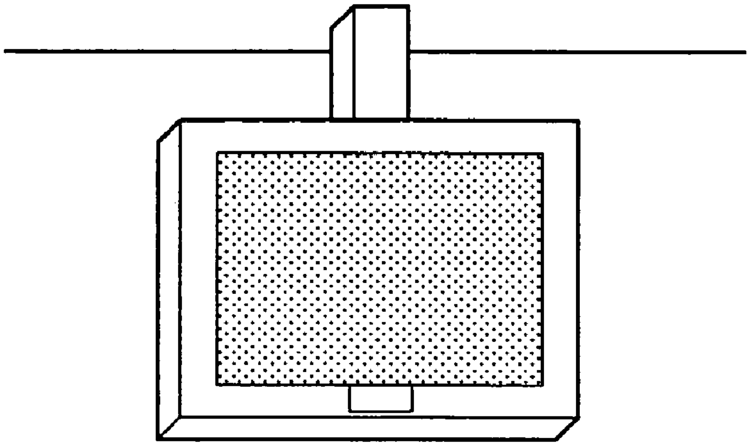
Figure 6C:
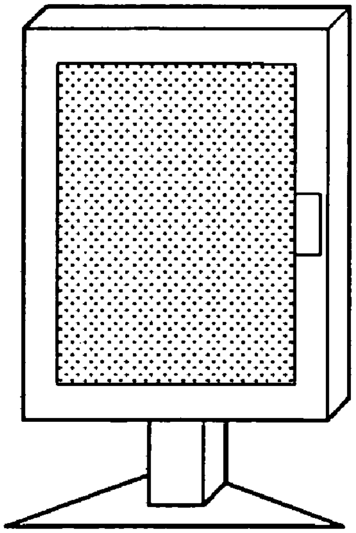

Here, vertical inversion sensor 25 is to detect mode change between the normal installed state (stand-mounted state) shown in FIG. 6(*a*) and the vertically inverted mode (ceiling suspended state) shown in FIG. 6(*b*). In-plane rotation sensor 26 is to detect mode change between the normal installed state (stand-mounted state) shown in FIG. 6(*a*) and the 90 degree rotated mode (the portrait orientation mode) shown in FIG. 6(*c*). These sensors 25 and 26 may be constituted separately by a gravity switch, etc., or may use a common orientation sensor such as a gyrosensor etc.

Illustratively, when the installed state of the device is switched from the normal installed state (stand-mounted state) to the vertically inverted mode (ceiling suspended state) or to the 90 degree rotated state (portrait orientation mode), flow passage of heated air in the device housing varies so that the temperature distribution across liquid crystal display panel 4 will also change. As a result, it is no longer possible to read out suitable emphasis conversion parameters and unsuitable emphasis converted data may be supplied to liquid crystal display panel 4, posing a risk of image degradation such as afterglow, tailing, etc.

To deal with this, in the liquid crystal display of the present embodiment, in order to reduce the influences from local heating components etc., depending on the installed state of the device as far as possible, the control signal for selecting the suitable emphasis conversion parameters is generated by selectively sampling only the temperature data that corresponds to the predetermined screen areas, or by putting more weight on the data to calculate the weighted average.

Specifically, dependent on each device-installed state, the control signal is generated based on only the detected temperature data from one or multiple temperature detecting sensors that correspond to the LCD panel screen areas not affected by local heating components, so as to achieve switching control so that the detected temperature data from the temperature detecting sensors that correspond to the LCD screen areas affected by local heating components, will not be referred to.

Alternatively, dependent on each device-installed state, the control signal is generated by calculation of the weighted average in which more weight is put on the detected temperature data from one or multiple temperature detecting sensors that correspond to the LCD panel screen areas not affected by local heating components while less weight is put on the detected temperature data from the temperature detecting sensors that correspond to the LCD panel screen areas affected by local heating components.

As stated above, according to the liquid crystal display of the present embodiment, since it is possible to determine the control signal for selecting the suitable emphasis conversion parameters by implementing predetermined calculation of the detected temperature data of divided screen areas, in accordance with the temperature distribution arising across the liquid crystal display panel depending on the installed state of the device, it is possible to positively prevent occurrence of afterglow and tailing in the whole screen.

Also in the present embodiment, it is also possible to provide a configuration in which more preferable emphasis conversion parameters can be selected based on the detected result of the installed state of the device, by determining the control signal by appropriately selecting one of the above calculating algorithms (1) to (6) in the sixth embodiment or using a combination thereof.

The Eleventh Embodiment

Next, the eleventh embodiment of the present invention will be described in detail with reference to FIG. 27. The same components as those in the above sixth and seventh embodiments are allotted with the same reference numerals and description for those is omitted. Here, FIG. 27 is a block diagram showing a schematic configuration of essential components in a liquid crystal display of the present embodiment.

Figure 27:
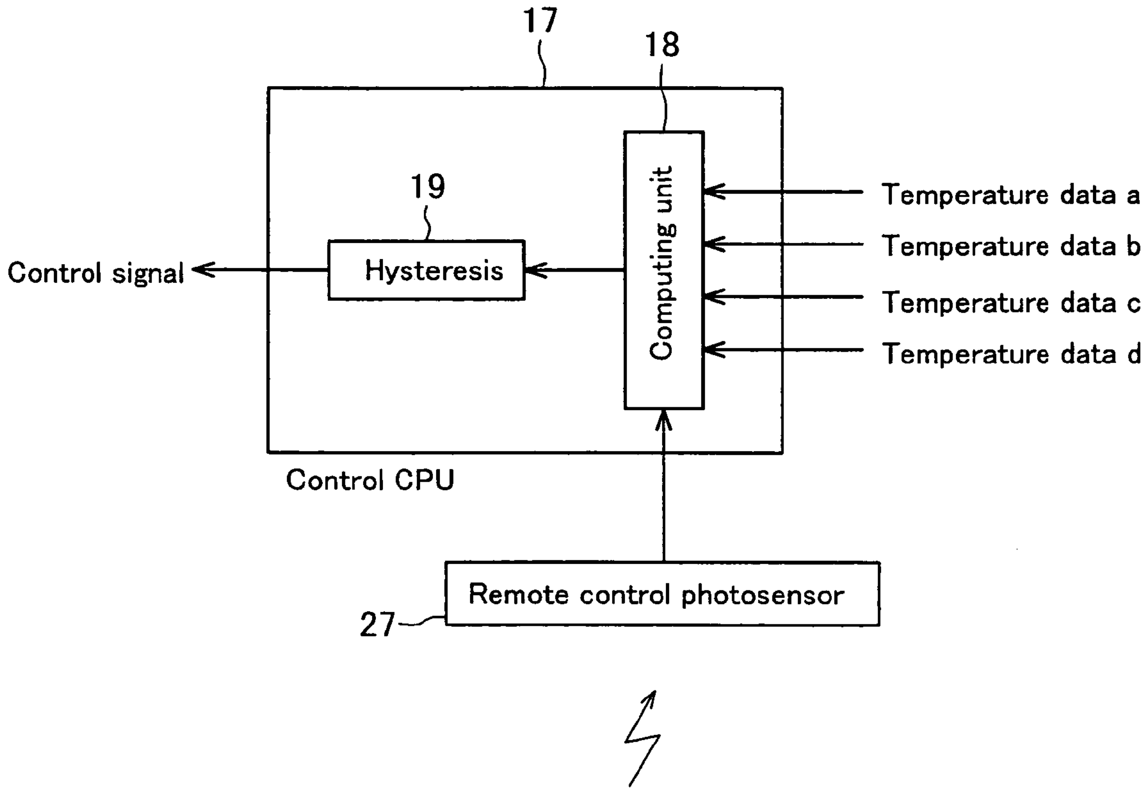
FIG. 27 is a block diagram showing a schematic configuration of essential components in the eleventh embodiment of a liquid crystal display of the present invention.

The liquid crystal display of the present embodiment, as shown in FIG. 27, has a remote control photosensor 27 for receiving remote control signals corresponding to operation commands designated and input by the user using an unillustrated remote controller, and is configured so that, based on the user's command received by this remote control photosensor 27, the computing process in computing unit 18 of control CPU 17 is variably controlled.

Specifically, in order to reduce degradation of image quality such as afterglow, tailing etc., due to optical response characteristic of the liquid crystal display panel, in a partial screen area, of the whole display screen of the liquid crystal display panel, in which notable images that attract the user are displayed, the partial screen area having the notable images displayed is adapted to be designated by the user, so that the control signal for selecting the suitable emphasis conversion parameters will be generated by selectively sampling only the temperature data that corresponds to the designated screen area, or by putting more weight on the data to calculate the weighted average.

Further, in an environment where part of the screen area of the liquid crystal display panel is exposed to direct blow of air from a room air-conditioner or to direct sunshine in a sunny place, it is possible for the user to designate appropriate screen area so as to eliminate these influences as far as possible, to thereby selectively sample only the temperature data that corresponds to the designated screen area, or put more weight on the data to calculate the weighted average.

As stated above, according to the liquid crystal display of the present embodiment, since suitable selection of emphasis conversion parameters can be made based on the detected temperature data from the screen area designated by the user's input, it is possible for the user to realize image display of high image quality with reduced afterglow and tailing.

Also in the present embodiment, it is also possible to provide a configuration in which more preferable emphasis conversion parameters can be selected based on the detected result of the user's input, by determining the control signal by appropriately selecting one of the above calculating algorithms (1) to (6) in the sixth embodiment or using a combination thereof. Further, obviously, the user's command input can be made through a control panel portion provided for the device body, not limited to use of remote controller.

INDUSTRIAL APPLICABILITY

The liquid crystal display according to the present invention is effective to the displays for computers as well as television receivers. Particularly, it is suitable to further improve the display image in image quality in an overshoot drive configuration for enhancing the optical response of the liquid crystal display panel.

The invention claimed is:

1. A liquid crystal display for image display using a liquid crystal display panel, comprising:

a temperature detector for detecting a temperature of a device interior;

a control section for generating a control signal by implementing a hysteresis process with regard to the detected temperature from the temperature detector; and a write-gray scale level determining section for determining an emphasis converted data that compensates for an optical response characteristic of the liquid crystal display panel, by implementing an emphasis conversion of an input image data of a current vertical period using emphasis conversion parameters determined based on the control signal generated by the control section and gray scale level transitions of the input image data from a previous vertical period to the current vertical period.

2. The liquid crystal display according to claim 1, wherein the control section compares the detected temperature from the temperature detector with a predetermined threshold temperature, and outputs a control signal for selecting the emphasis conversion parameters corresponding to the detected temperature when the detected temperature has continuously become higher or lower than the predetermined threshold temperature for at least a predetermined number of times.

3. The liquid crystal display according to claim 1, wherein the control section compensates for a deviation of the detected temperature from the temperature detector to a temperature of the liquid crystal display panel surface.

4. The liquid crystal display according to claim 3, wherein the control section variably controls the temperature deviation to be compensated for, in accordance with a passage of time after a power activation.

5. The liquid crystal display according to claim 1, wherein the emphasis conversion parameters are generated by a linear interpolation based on the input image data from the previous vertical period and the input image data from the current vertical period.

6. The liquid crystal display according to claim 1, wherein the emphasis converted data includes gray scale level data.

7. A liquid crystal display for image display using a liquid crystal display panel, comprising:

a temperature detector for detecting a temperature of a device interior;

a control section for generating a control signal by implementing a hysteresis process with regard to the detected temperature from the temperature detector; and a write-gray scale level determining section for determining an emphasis converted data that compensates for an optical response characteristic of the liquid crystal display panel, by implementing an emphasis conversion of an input image data of a current vertical period using emphasis conversion parameters determined based on the control signal generated by the control section and gray scale level transitions of the input image data from a previous vertical period to the current vertical period, wherein the write-gray scale level determining section comprises:

a plurality of table memories which store different sets of emphasis conversion parameters for predetermined plural temperature ranges, for converting the input image data into emphasis converted data that compensates for the optical response characteristic of the liquid crystal display panel in accordance with the gray scale level transitions of the input image data from the previous vertical period to the current vertical period; and a selector for selecting one of the plural table memories in accordance with the control signal generated by the control section, and the emphasis conversion parameters read out from the selected table memory by the selector are used to determine the emphasis converted data corresponding to the input image data, which in turn is supplied as a write-gray scale level data to the liquid crystal display panel.

8. A liquid crystal display for image display using a liquid crystal display panel, comprising:

a temperature detector for detecting a temperature of a device interior;

a control section for generating a control signal by implementing a hysteresis process with regard to the detected temperature from the temperature detector; and a write-gray scale level determining section for determining an emphasis converted data that compensates for an optical response characteristic of the liquid crystal display panel, by implementing an emphasis conversion of an input image data of a current vertical period using emphasis conversion parameters determined based on the control signal generated by the control section and gray scale level transitions of the input image data from a previous vertical period to the current vertical period, wherein the write-gray scale level determining section comprises:

a table memory which stores different sets of emphasis conversion parameters for predetermined plural temperature ranges, in separate reference table areas, for converting the input image data into emphasis converted data that compensates for the optical response characteristic of the liquid crystal display panel in accordance with the gray scale level transitions of the input image data from the previous vertical period to the current vertical period; and a selector for selecting one of the plural reference table areas based on the control signal generated by the control section, and the emphasis conversion parameters read out from the selected reference table area in the table memory by the selector are used to determine the emphasis converted data corresponding to the input image data, which in turn is supplied as a write-gray scale level data to the liquid crystal display panel.

9. The liquid crystal display according to claim 7 or claim 8, wherein the table memory stores emphasis conversion parameters for transition patterns as representative gray scale levels of display data gray scales.

* * * * *